US011755536B1

(12) United States Patent
Pushkin

(10) Patent No.: US 11,755,536 B1
(45) Date of Patent: Sep. 12, 2023

(54) SYSTEM-INDEPENDENT DATA LINEAGE SYSTEM

(71) Applicant: Amazon Technologies, Inc., Seattle, WA (US)

(72) Inventor: Yahor Pushkin, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 597 days.

(21) Appl. No.: 16/740,263

(22) Filed: Jan. 10, 2020

(51) Int. Cl.
| *G06F 16/17* | (2019.01) |
| *G06F 16/16* | (2019.01) |
| *G06F 11/34* | (2006.01) |
| *G06F 11/14* | (2006.01) |
| *G06F 16/21* | (2019.01) |

(52) U.S. Cl.
CPC ...... *G06F 16/1734* (2019.01); *G06F 11/1464* (2013.01); *G06F 11/3495* (2013.01); *G06F 16/168* (2019.01); *G06F 16/219* (2019.01); *G06F 2201/84* (2013.01)

(58) Field of Classification Search
CPC .. G06F 16/1734; G06F 16/219; G06F 16/168; G06F 11/1464; G06F 11/3495; G06F 2201/84
See application file for complete search history.

(56) References Cited

U.S. PATENT DOCUMENTS

| 9,659,042 | B2* | 5/2017 | Puri | G06F 16/35 |
| 9,875,241 | B2* | 1/2018 | Bator | G06F 16/26 |
| 10,037,329 | B2* | 7/2018 | Aggarwal | G06F 16/2471 |
| 10,769,165 | B2* | 9/2020 | Simon | G06Q 10/063 |
| 2009/0193050 | A1* | 7/2009 | Olson | G06F 16/211 |
| | | | | 707/999.102 |
| 2018/0089277 | A1* | 3/2018 | Vankamamidi | G06Q 10/0637 |
| 2018/0181567 | A1* | 6/2018 | Bator | G06F 16/40 |

* cited by examiner

*Primary Examiner* — Alford W Kindred
*Assistant Examiner* — Tiffany Thuy Bui
(74) *Attorney, Agent, or Firm* — S. Scott Foster; Kowert, Hood, Munyon, Rankin & Goetzel, P.C.

(57) ABSTRACT

A data lineage system tracks performance of data flows through different transformations independent of the systems that perform the transformations. A data flow model is maintained as a graph in the data lineage system that is updated by data processors to include performance history of different transformations in the data flow. Subsequent analyses of the data flow model, such as tracing particular data, can be supported using the recorded performance information in the graph of the data flow model.

20 Claims, 24 Drawing Sheets example data model 800 example grouping semantics for data model 900

```
# Find dependencies
tr_rev = model.find_transform(id=...).latest()
ds_rev_in_1 = model.find_dataset(id=...).latest()
ds_rev_in_2 = model.find_dataset(id=...).revision(id=...
)ds_out_1 = model.find_dataset(id=...)
ds_out_2 = model.find_dataset(id=...)

# Record outputs
ds_rev_out_1 = ds_out_1.new_revision(
   external_blob_id=...)
ds_rev_out_2 = ds_out_2.new_revision(
   external_blob_id=...)

# Record transform execution
tr_exec = tr_rev.new_execution(input={
   tr_rev.input.slots[0].id: ds_rev_in_1,tr
   _rev.input.slots[1].id: ds_rev_in_2
}, output={
   tr_rev.output.slots[0].id: ds_rev_out_1,tr
   _rev.output.slots[1].id: ds_rev_out_2
})

# Commit transaction consisting of new execution and its produc
tstransaction = model.new_transaction()
transaction.add_transform_execution(tr_exec)
transaction.add_dataset_revision(ds_rev_out_1)t
ransaction.add_dataset_revision(ds_rev_out_2)
transaction.commit()
```

*manual execution recording 1900*

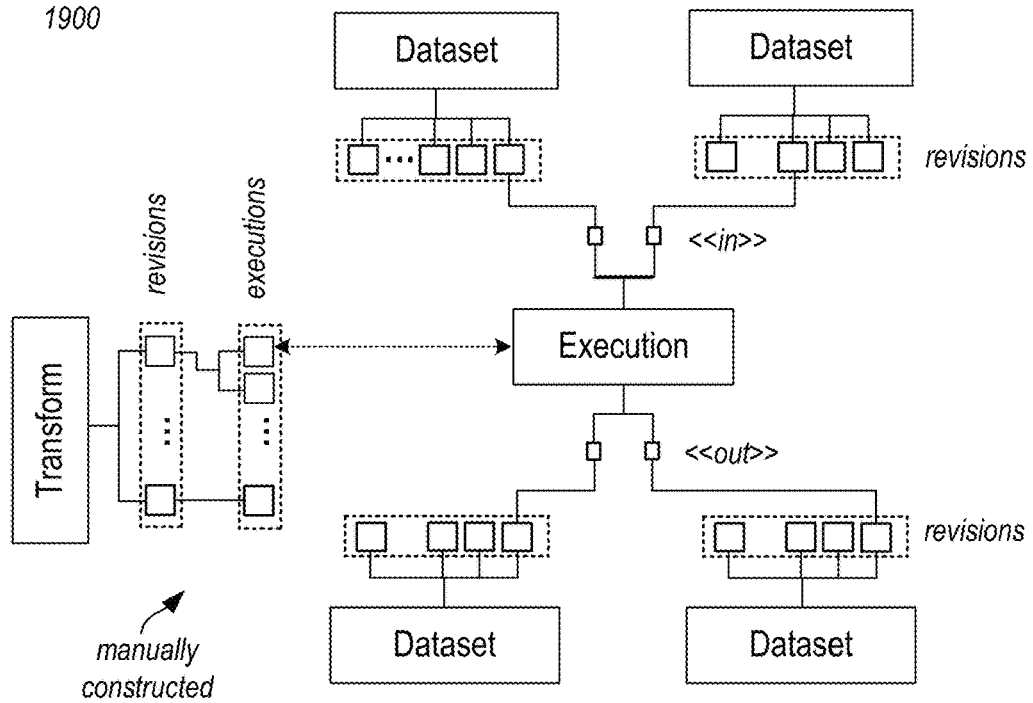

*manually constructed transaction model 1910*

FIG. 19

SYSTEM-INDEPENDENT DATA LINEAGE SYSTEM

BACKGROUND

A variety of data ecosystems grow in various areas, including different industries and technological environments, such as information technology. The amount of data collected on a daily basis increases exponentially fueled by advances in edge collection techniques (e.g., for Internet of Things (IoT) applications) and the ability to store and process vast amounts of data. This rapid growth gave birth to a variety of data processing systems targeted at those areas and as a result led to technical and organizational fragmentation.

To utilize the generated data, various systems, services or other systems for performing data processing operations, such as consumption of data, transformation of data, and production of derivatives from the data have utilized to allow various users, entities, applications or other organizations to structure and redefine data processing workflows in a data-driven manner.

BRIEF DESCRIPTION OF THE DRAWINGS

FIG. 19 illustrates an example of an explicit programming paradigm for using an interface of a data lineage service, according to some embodiments.

Figure 1:
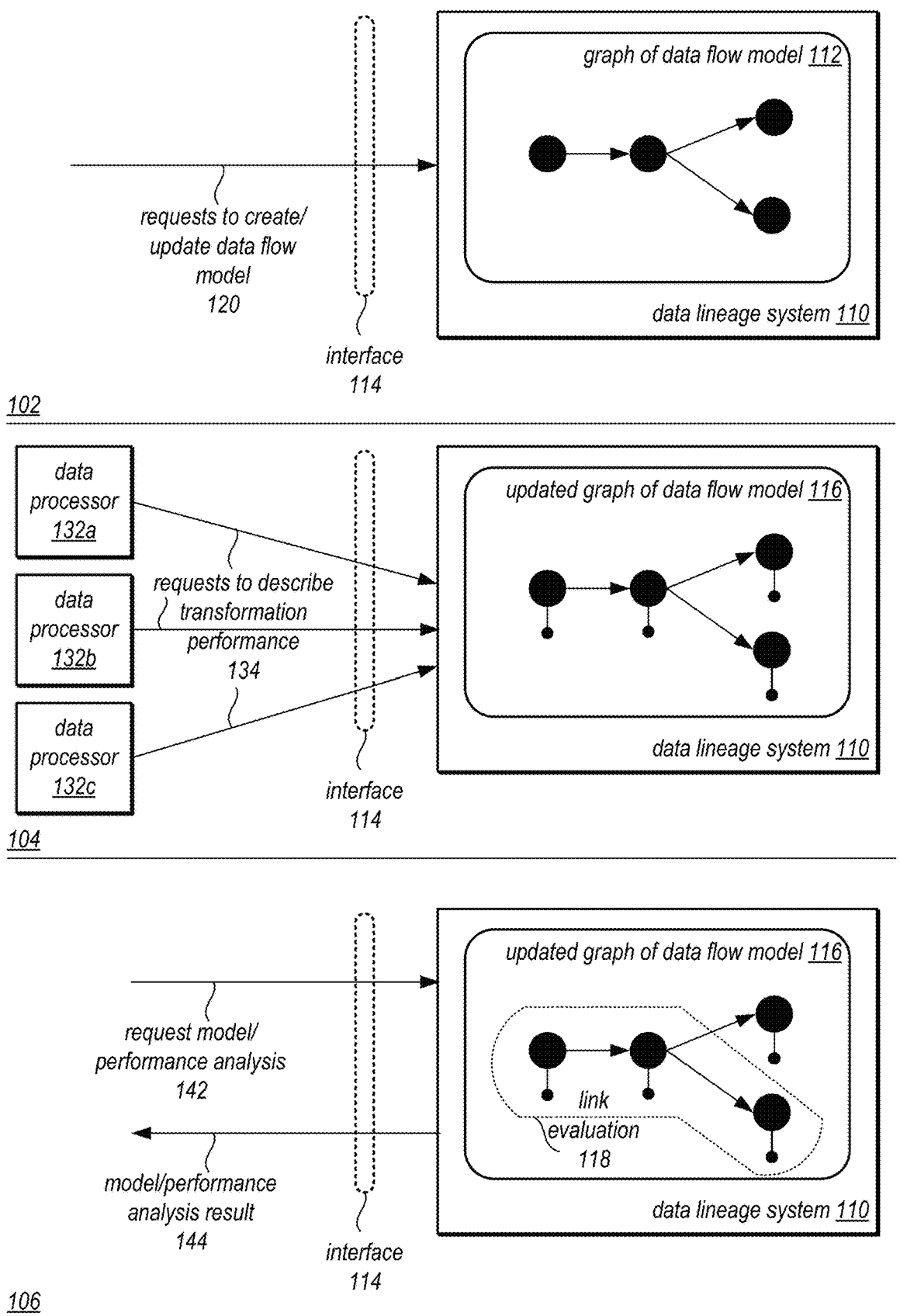
FIG. 1 illustrates a series of logical block diagrams of using a system-independent data lineage system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Given the large ecosystem of data processing technologies, tracing and other analyses based on performance history and other features of a data processing flow are often unavailable, lacking basic abilities for the analysis of data routes and ways data flows through a data processing systems. This lack of information leads to oversights in data flow design, introduces compliance violations and opens the door for unintended access to sensitive data. Thus, techniques that support greater availability of data flow tracking and analysis are highly desirable.

Various techniques for implementing a system-independent data lineage system are described herein. A system-independent data lineage system may provide a standalone system that can be used for tracking data manipulations in technology- and system-agnostic manner. In this way, a data lineage system can be independent of any specific implementation of data transformation and/or data storage paradigm. Moreover, such techniques increase the capabilities for data flow processing analysis. For example, in various embodiments, these techniques may support the ability to record the state of a data system to improve visibility, enable reproducibility by formally describing every transformation data undergoes, improve auditability of the system, provide compliance conformance monitoring and enforcement, honor privacy of data contributors, and enforce stronger levels of security and simplify gap analysis, among other capabilities. In various embodiments, a data flow model suitable for mapping data manipulations occurring in complex environments. In this way, a data lineage system can utilize the model to adapt to or scale to a wide range of applications. For example, the model can allow multiple independent (and incompatible) data systems to record the history of all data transformations performed via the introduction of a shared (yet independent) medium—the data lineage system. As a standalone data lineage system, execution of arbitrary data flows spanning multiple components can be recorded.

In various embodiments, a data lineage system may be able to track and provide a description of what happens with any piece of data registered with the system at any point-in-time and establish source-target relationships between operations that are performed upon the piece of data. For example, a graph data structure may be used to store a data flow model for a data lineage system by representing different entities, objects, and/or other features of the data flow model as various nodes or other portions of the graph (e.g., as links and/or node attributes). In various embodiments, data mutations or transformations that convert data from one representation to another may be modeled and may be represented in textual form as:

$$Dt = T(D)$$

where the data transformation (Dt) is the application of a transform (T) to a dataset (D). Such a data flow model can be extended to indicate that transforms deal with multiple datasets (e.g., data blobs) and allow for both sides (e.g., data and transformations) undergo continuous iteration (e.g., revisions), represented textually as:

$$[Dt:Rt, \ldots] = T([D:R, \ldots])$$

Using such semantics, various data processing flows can be modeled. For example, a machine learning flow can be represented in the following way as:

Model,EvalMetrics=Eval(Train(PreTrained,PreProc (TrainSet)),TestSet)

In various embodiments, the data flow model, as discussed in detail below with regard to FIGS. 3-20, may support various types of tracking, recording, or otherwise representing the structure and performance of data processing, as well as various types of complex analysis. For example, forward tracing may be supported, as discussed below with regard to FIG. 13. A forward tracing operation may produce a complete list of data products (with references to involved transform executions) derived off a specific piece of data, in some embodiments. Forward tracing may also provide an ability to see how data products are being spread across the system and observe areas impacted by the various system features (e.g., transformations) that interact with the data products. For tracing may allow for identifying dependencies within a data flow that can be used for passive analysis as well as active broadcasting of compliance notifications.

Another example of analysis supported by a data flow model for system-independent data lineage systems is backward tracing, discussed in detail below with regard to FIG. 14. To implement backward tracing, a reverse lookup may be initiated from a dataset (e.g., a data blob) leading to the entire hierarchy of its direct ascendants, in some embodiments. Backward tracing may be useful when analyzing the impact of data and code changes occurring over time. In some scenarios, systems consisting of various interconnected components may present a great challenge for determining the impact of data and code changes when investigation crosses the boundaries of components.

Another example of analysis supported by a data flow model for system-independent data lineage systems is defining the state of the environment (a combination of data and performed transformations) used for complete reproduction of a specific dataset (which may be an extension of backward tracing techniques discussed above).

Another example of analysis supported by a data flow model for system-independent data lineage systems is system evolution. System evolution analysis may provide an additional dimension to traversal capabilities (for both forward and backward tracing) allowing data relations to be tied to iterations the system being monitored went through in chronological order.

Another example of analysis supported by a data flow model for system-independent data lineage systems is actor participation. In various embodiments, actor participation may analyze the system from the perspective of actors responsible for all data manipulations performed. Actor information may combine awareness of parties involved in the process of data flow with reasoning and additional context around performed mutations.

FIG. 1 illustrates a series of logical block diagrams of using a system-independent data lineage system, according to some embodiments. Data lineage system 110 may be a standalone system implemented as part of a private network of systems or applications, or as discussed below with regard to FIG. 2, implemented as a part of a publicly available service like those services offered by a provider network.

Data lineage system 110 may host the data flow model, according to the data flow model as discussed below, as a graph 112. In this way, the relationships between the modeled objects in the data flow can be linked. For example, various links, objects, entities or other data flow model features, such as dataset objects and transformations discussed below with regard to FIGS. 3, 4, and 6, type objects as discussed below with regard to FIG. 5, flow objects discussed below with regard to FIG. 7, organization units as discussed below with regard FIG. 11, or other objects, such as the various objects and attributes discussed below with regard to FIGS. 8 and 9, may be stored in a graph structure in order to perform graph-based lookups, searches, and/or traversals in order to organize data in storage in way that corresponds to the data flow being modeled.

As illustrated in scene 102, a data lineage system 110 may implement an interface 114 to allow various requests 120 to create and/or update data flow model. Requests, like requests 120, may be formatted and/or sent as various commands, protocols, or other interactions via interface 114. In at least some embodiments, interface 114 may be a programmatic interface, supporting one or more Application Programming Interfaces (APIs) to create, read, update, or delete the various entities, objects, or other features of the data flow model discussed below. For example, requests to create dataset objects, transformation objects, data flow objects or type objects, as well as their various child objects or attributes, such as revisions and executions may be sent as different respective API requests 120 (or may be specified through a single API request or through smaller groups of API request, such as a create/add request, an update request, a delete request, or a read request). In some embodiments, an API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

A created data flow model, like graph model 112 may be used to track the performance of the data flow upon datasets, which may store one or more items of data, stored, encoded, or otherwise represented in various data types or formats. As illustrated in scene 104, interface 114 of data lineage system 110 may allow different data processors, such as data processors 132*a*, 132*b*, and 132*c*, to describe transformation performance for different modeled transformations. For example, the transformations performed upon a revision of a dataset according to the execution of different revisions of different transformations may be described according to the model features discussed below regard to FIGS. 3-20. The graph model may be updated, as indicated at 116, in order to include the describe performance information as part of a performance history, which may be retrieved or determined by traversing or searching along the graph structure for those included attributes or objects recorded to record the individual executions and/or revisions of a data flow, in various embodiments.

Data processors, like data processors 132*a*, 132*b*, and 132*c*, may be various kinds of data storage, transformation, or other operations that interact with data processed according to the data flow modeled in data lineage system (e.g., as represented by graph model 112). Different types of data processors may be implemented as different systems, applications, services, devices, or other systems, allowing for the representation and tracking of performance in data lineage system 110 to be independent from the data processors. Instead, data processors may utilize interface 114 to submit requests to describe the execution of various transformations or other features of a data flow. For example, as discussed below with regard to FIGS. 19 and 20, various APIs may be used to invoke the update of a performance history captured in the graph for the data flow being modeled. In some embodiments, a single data processor may perform the various transformations and/or other model operations and thus may alone submit requests to describe performance 134.

As illustrated in scene 106, different analyses, as discussed below with regard to FIGS. 10 and 13-16, by supporting via interface 114, one or more model performance analyses or requests, such as requests 142. To perform the requests, the links between nodes may be evaluated, as indicated at 118, to perform analyses such as backward and forward tracing, among others. A result 144 may then be provided by data lineage system 110. In some embodiments, the analyses may be performed by external or systems separate from data lineage system 110, and thus analyses results may be used to provide or integrate with other analysis systems.

The previous description of a system-independent data lineage system in FIG. 1 is a logical illustration and thus is not to be construed as limiting as to the architecture for implementing a data lineage system.

This specification begins with a general description of a provider network that implements a data lineage service. Then various examples of the data lineage service service including different components/modules, or arrangements of components/module that may be employed as part of implementing the data lineage service are discussed. Various features of the data flow model and analyses supported by the data lineage service are then discussed. A number of different methods and techniques to implement system-independent data lineage systems are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
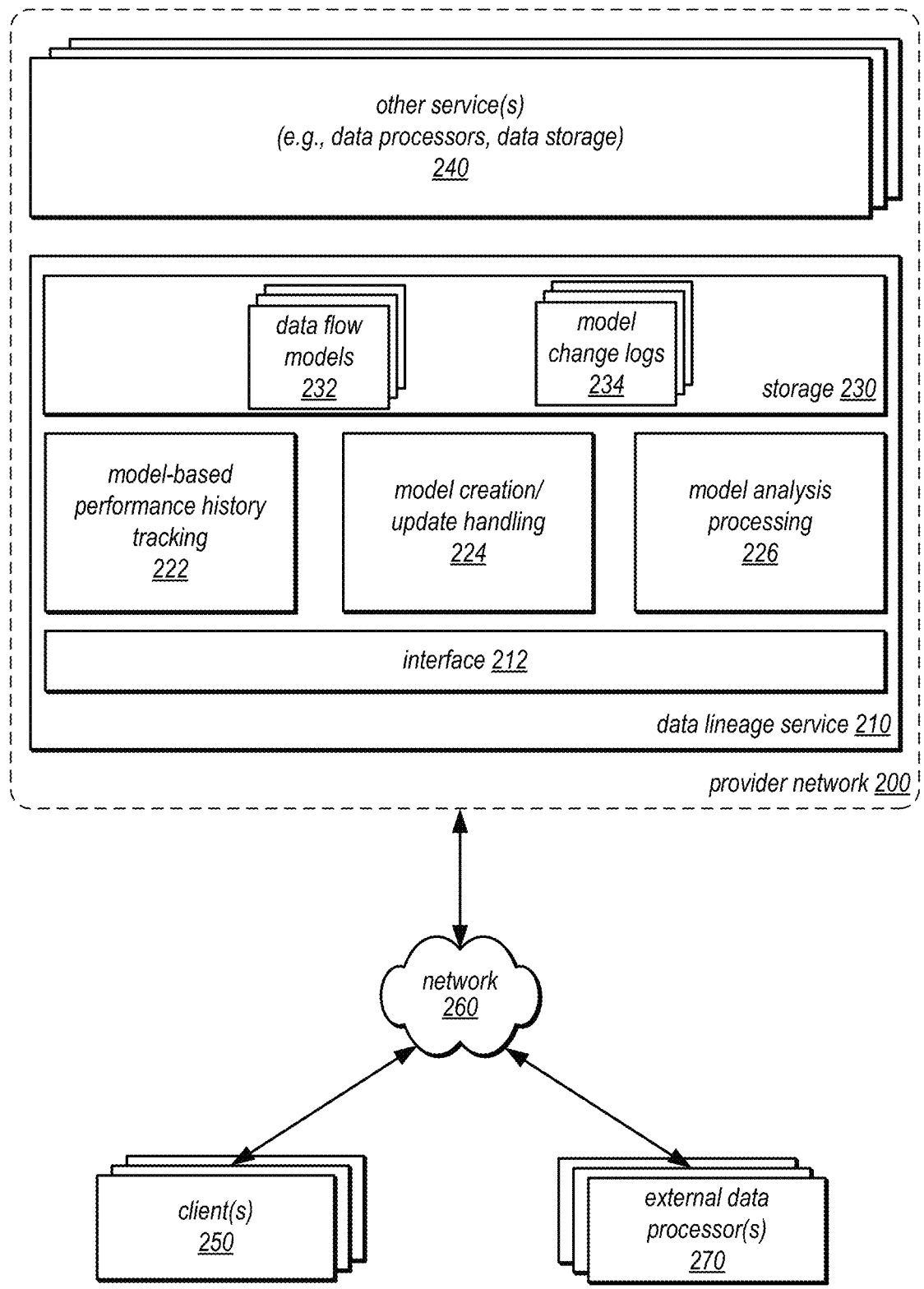
FIG. 2 is a logical block diagram illustrating a provider network implementing a data lineage service that is system-independent, according to some embodiments.
Figure 3:
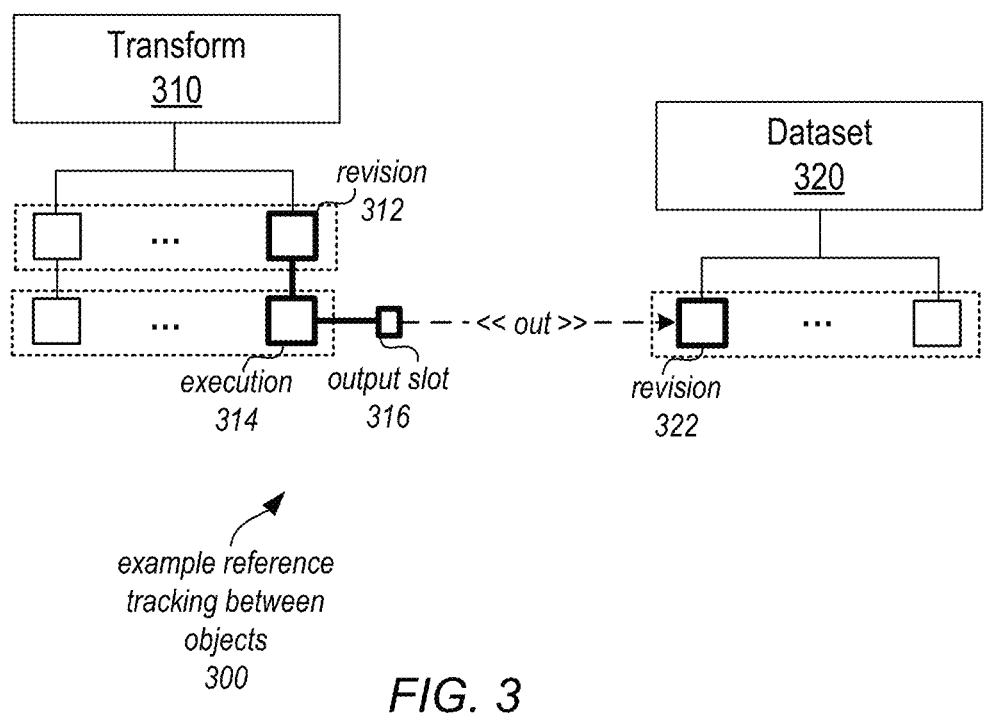
FIG. 3 illustrates an example reference tracking between objects, according to some embodiments.

FIG. 2 is a logical block diagram illustrating a provider network implementing a data lineage service that is system-independent, according to some embodiments. Provider network 200 may be a private or closed system or may be set up by an entity such as a company or a public sector organization to provide one or more services (such as various types of cloud-based storage) accessible via the Internet and/or other networks to clients 250 and external data processor(s) 270. Provider network 200 may be implemented in a single location or may include numerous data centers hosting various resource pools, such as collections of physical and/or virtualized computer servers, storage devices, networking equipment and the like (e.g., computing system 3000 described below with regard to FIG. 24), needed to implement and distribute the infrastructure and storage services offered by the provider network 200.

For example, the provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

In some embodiments, provider network 200 may implement various computing resources or services, such as a data storage service(s), data lineage service 210, as well as other service(s) 240, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the provider network 200, which may be provisioned in user accounts.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 24 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data lineage service 210 may implement an interface 212 which may support various interactions discussed above with regard to FIG. 1, and below, with regard to FIGS. 3-23, to create, update, record, track, and/or analyze a data flow model. In various embodiments, data lineage service 210 may implement model-based performance history tracking 222 to handle requests to describe the performance of various transformations upon a dataset. For example, requests to indicate the execution of a transformation of a specified revision may be received from the data processor (e.g., a map reduce cluster) that performed the transformation via interface 212. Model-based performance tracking may perform the appropriate requests to update the data flow models 232 with the performance information (e.g., recording new attributes or instances of execution of a transformation and/or revisions of a dataset). For instance, various requests to add a node in a graph structure that corresponds to an execution of a transformation for a specified dataset, as specified according to the data flow model below, may be created and sent to the various interfaces, servers, systems or hosts that implement storage 230 for models 232.

Data lineage service 210 may implement model creation/update handling 224 to handle various requests to create and/or update a model. For example, the various objects, relationships, and/or features of the data flow model discussed below may be created, updated, or deleted according via a graphical user interface (e.g., a service console) that invokes the APIs to cause the creation, update, or deletion of corresponding nodes in the underlying storage 230 for data flow models 232 (e.g., using graph database APIs to update a graph that stores the model in a graph database implemented as part of storage 230).

Model creation update handling 224 may maintain the model change logs 234 (e.g., as a separate change log for each model). In some embodiments, model creation/update handling 224 may implement a transaction-based consistency or control mechanism for making changes to a model. In such embodiments, changes to a model may be proposed as a transaction that may be accepted and committed to the model or rejected. For instance, as discussed below with regard to FIG. 22, conflicting transactions (e.g., with other proposed transactions) proposed to the same model may be denied (or one of the conflicting transactions may be denied another one of the transactions may be accepted). In some embodiments, different authorization or consent mechanisms may be implemented to determine whether a proposed transaction can be committed, such as by requiring a number of approvers to indicate acceptance of the proposed transaction, utilizing timestamps or other tie-break mechanisms to select which transaction to accept in the event of conflict.

Data lineage service may implement model analysis processing 226 to perform various analyses using data flow models 232 and model change logs 234, such as backward and forward tracing, timeline visualization, code change visualization, among other analyses discussed below, with regard to FIGS. 10 and 13-16. In some embodiments, model processing analysis 226 may provide an interface to obtain "raw" or "intermediate" which can then be used by other analyses tools to performing graphing, forecasting, or other analytics (e.g., by providing the various transformations in a path according to a trace along with performance information, such as timestamps for when the descriptions were recorded, in order to analyze a data flow for bottlenecks).

Storage 230 may be one or multiple different types of storage systems, in some embodiments. For example, storage 230 for data flow models 232 may be a graph-based database to support the storage of models as graph structures, whereas a separate system or service that provides storage 230 for model change logs 234 may be a log-structured data store, relational database, or noSQL storage. In some embodiments, storage 230 may be implemented as part of a separate service (e.g., a separate database service or object storage service). Although not illustrated, various backup and archiving features of data flow models 232 and model change logs 234 may be implemented as part of storage 230. In some embodiments, access to the underlying data structures (e.g., graphs) for data flow models 232 and model change logs (e.g., log records) may be provided to "download" or otherwise transmit/export the data flow models 232 and model change logs 234 to another system or service.

In various embodiments, data processors that utilize data lineage service 210 to model data flows may be implemented internal to a provider network (e.g., as part of other services 240) and/or external data processor(s) 270, which may be other provider network services, private services, systems, or applications, and so on. Data processors may be the service or system that is otherwise associated with performance of transformations or storage, in some embodiments. In this way, components that do not directly perform a transformation upon data, but direct, manage, monitor, or otherwise participate in the system that does perform the transaction may invoke or report the descriptions of performances of transformations to be included in a performance history. In some embodiments, a log of previous performance history may be sent to report performance information that did not update the performance history for a data flow when the transformations were performed. In this way, data flows performed "offline" or without communicating to data lineage service 210 may still utilize a data flow model and upload the performance information for subsequent analysis, in some embodiments.

Generally speaking, clients 250 may encompass any type of client configurable to submit network-based requests to provider network 200 via network 260, including requests for data lineage service 210 (e.g., a request to create, read, write, obtain, or modify a model, describe performance of a modeled data flow, and/or analyze a modeled data flow in data lineage service 210). For example, a given client 250 may include a suitable version of a web browser, or may include a plug-in module or other type of code module configured to access a management console to create data flow model. Alternatively, a client 250 may encompass an application such as a machine learning application that may report performance information for one or multiple transformations for a data flow modeled in data lineage service 210. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture. Although clients 250 are illustrated as external to provider network 200, in some embodiments clients of different services, like data lineage service 210, can be implemented within provider network 200 (e.g., implemented on a resource of other service(s) 230, such as virtual compute instance).

Clients 250 (or external data processors 270) may convey network-based services requests (e.g., requests to interact with data lineage service 220 to create a data flow model) to and receive responses from provider network 200 via network 260. In various embodiments, network 260 may encompass any suitable combination of networking hardware and protocols necessary to establish network-based-based communications between clients 250 (or external data processors 270) and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 (or external data processor 270) and the Internet as well as between the Internet and provider network 200. It is noted that in some embodiments, clients 250 (or external data processors 270) may communicate with provider network 200 using a private network rather than the public Internet.

Figure 8:
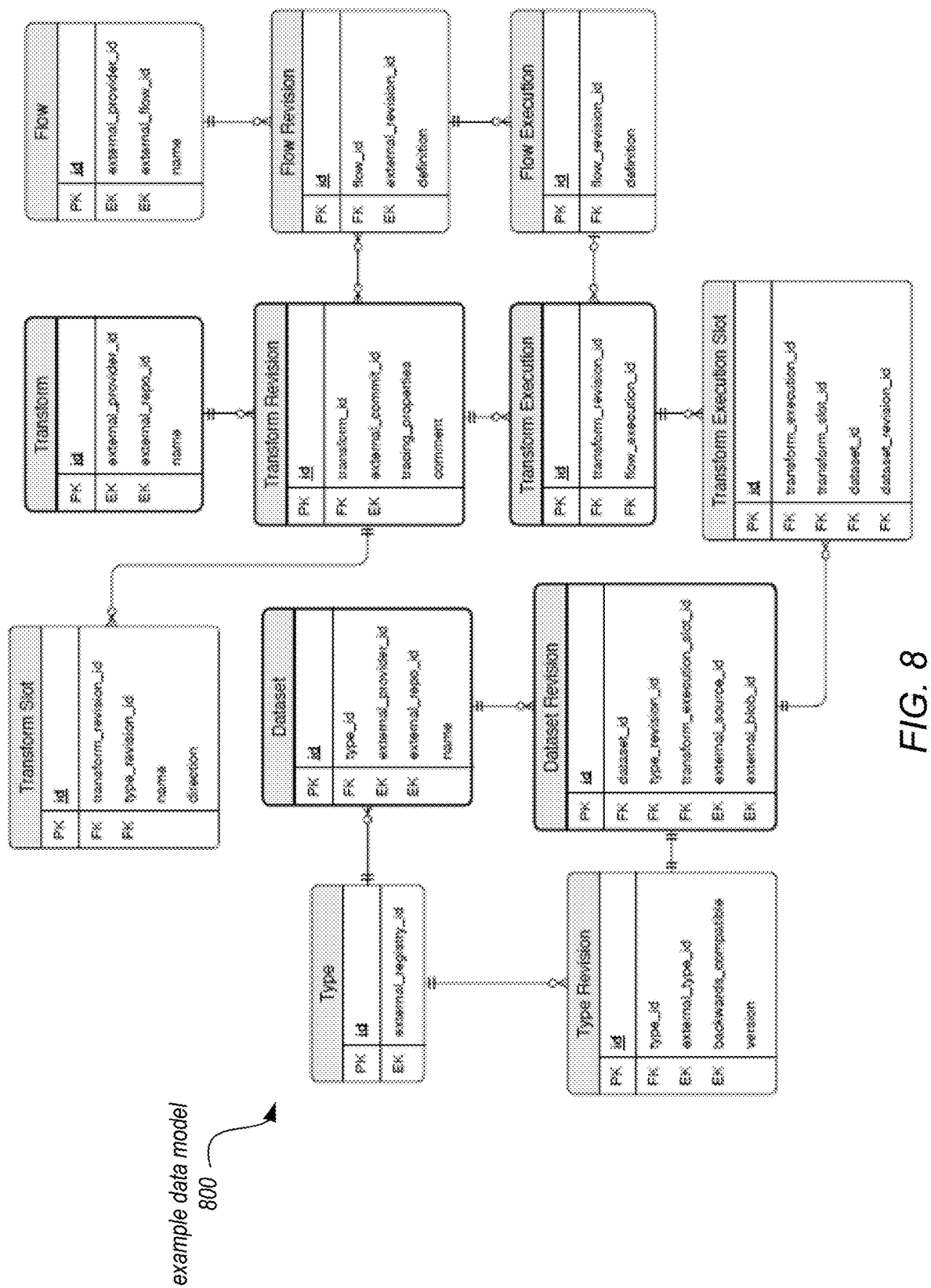
FIG. 8 illustrates an example data flow model for data lineage, according to some embodiments.
Figure 9:
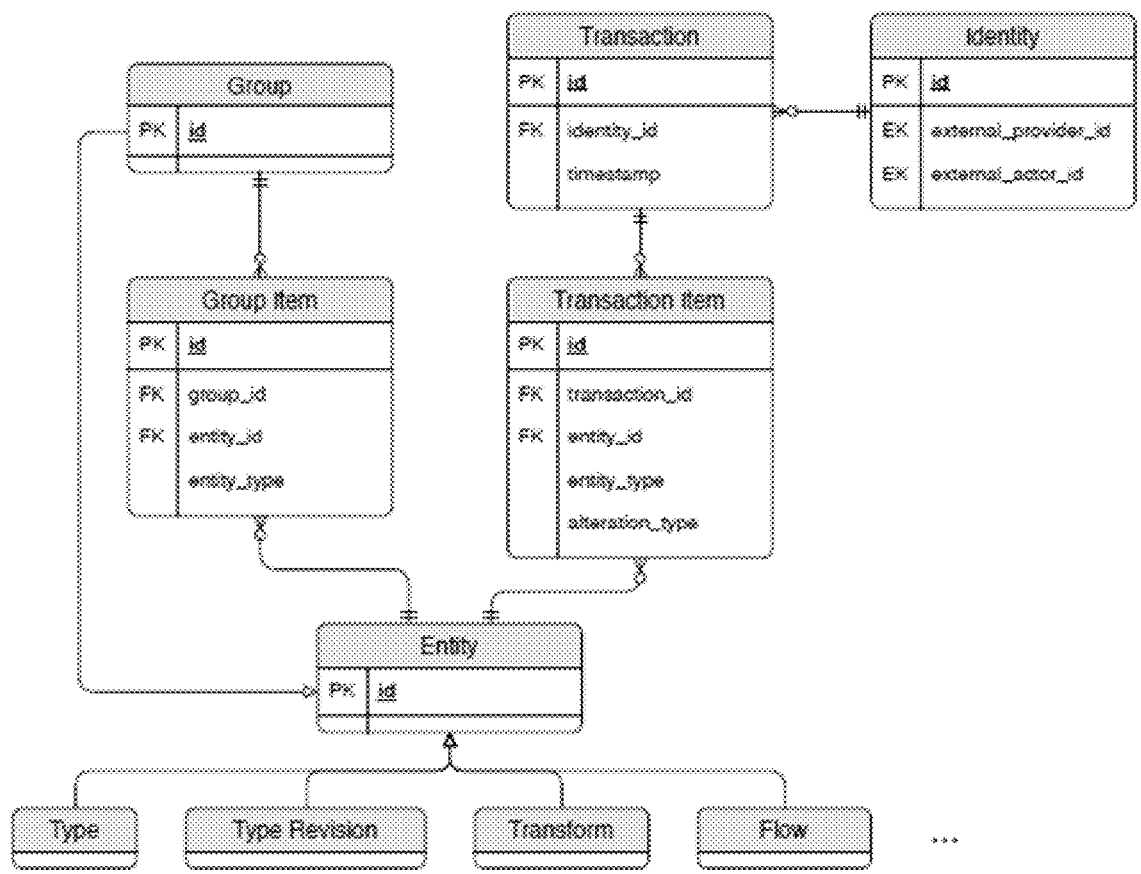
FIG. 9 illustrates an example of grouping semantics for a data flow model, according to some embodiments.
Figure 10:
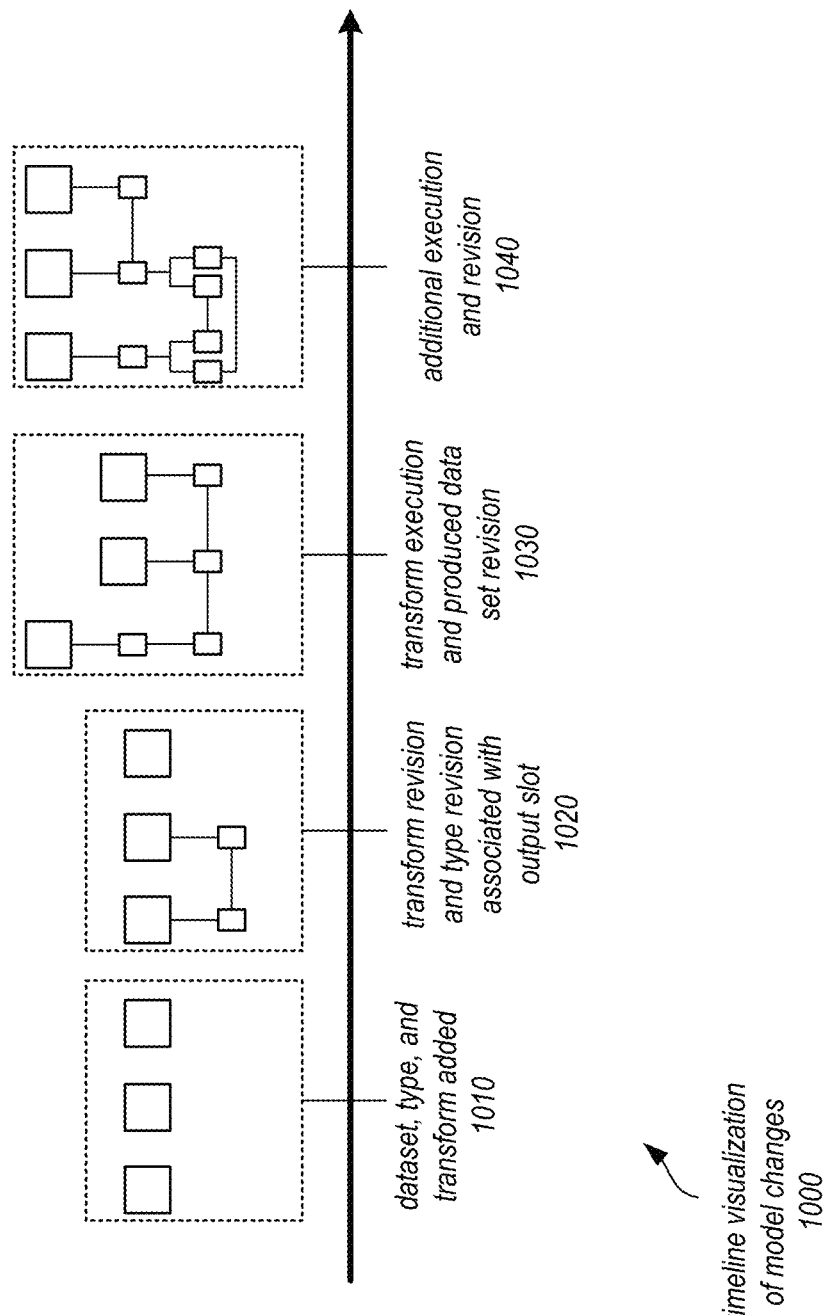
FIG. 10 illustrates an example timeline visualization of changes to a data flow model, according to some embodiments.

A data flow model for a system-independent data lineage system, such as data lineage service 210, may provide a framework suited for mapping data flows to the set of basic primitives covering both data products and manipulations, which may provide a flexible implementation. Object identifiers play a role in the implementation of a data flow model. Various techniques for generating object identifiers may be implemented for generating object identifiers that are unique (or at least unique within the scope of a particular entity type (e.g., dataset, dataset revision, transform). Most of the example models illustrated in the following Figures may not illustrate the object identifiers, but the relations illustrated in the models may be established through respective identifiers. For example, in FIG. 3, a transform object may include multiple revision objects, like revision 312, which may be mapped to multiple execution objects of transform 310, like execution 314, which may utilize an output slot 316 to provide the output data flow to a revision 322 of dataset 320. Although not illustrated, identifiers for these various entities may be utilized in a data store (e.g., a graph database) to establish the links between the entities. FIGS. 8 and 9 provide further details of various identifiers and attributes of entities that may be implemented in the data flow model, in some embodiments. In addition to graphical model illustrates, an example of a textual representation of entities in the data flow model is provided in the below table.

TABLE 1

| | Textual representation of entities. | |
|---|---|---|
| Elements | Definition | Examples |
| Entity Id | [entity] _ [identifier] | $DS_{in}$ |
| Entity | [dataset] ":" [revision] | $DS_i : R_j$ |
| | [transform] ":" [revision] ":" [execution] | $TR_i : R_j : E_k$ |
| Route | " [° [entity] ("," . . . ) "]" | $[DS_1, DS_2]$ |
| List | "L(" [entity or route] ("," . . . ) ")" | $L(DS_i : R_j, [DS_1, DS_2])$ |

In various embodiments, the data flow model for system-independent data lineage systems may be data-centric. In this way, any data flow can be modeled from the point of view of how data flows through various system(s) and provide a definition of data flow model for documenting elements of propagation semantics for the data flow. A dataset entity (or object) may be useful for describing models in the above manner. In various embodiments, a dataset may represent a piece of data tracked by the data lineage system. Data iterations performed by data processors can be analyzed and explored in relation to their actions performed upon a dataset. While some transformations performed over data are naturally bound (finite and unambiguously defined), a concept of static snapshot as a dataset can used to model, and thus capture, the state and progress of any data flow using the dataset as an abstraction.

We do not formally define rules for the appropriate granularity level applications should adopt when designing their data flows using this toolbox (mapping to datasets, transforms, etc.). We indicate that the purpose of the semantics introduced here is to track and analyze changes in the data and therefore every individual piece of it that can ever be produced or versioned separately should be represented by an independent dataset instance.

As data naturally evolves over time within and outside of various systems, the process of capturing changes in such an ever evolving environment may also be accounted for in the data flow model. Thus, a dataset may not directly refer to the data itself but act as a container for a set of iterations of the same logical data blob produced over time, in some embodiments. For instance, this could refer to data being regenerated as a consequence of changes made to input parameters of upstream process or naturally growing with new pieces being added. In such an example, each such iteration of a dataset ma represented in the form of dataset revision.

In various embodiments, dataset revisions may be recorded on the data lineage system (e.g., as immutable data blobs). New pieces of data recorded on the data lineage system may be recorded in the form of new dataset revision. The content of existing revisions—the data referred by those existing revisions—may not actually change as the dataset object is not storing the dataset itself but, as noted earlier, acting as a container pointing to the other versions of the dataset. Thus, in some embodiments, dataset revisions may not be changed.

In various embodiments, revisions within dataset object can be referred to by its identifier or relative position (: earliest, : latest, : head−1) in the model. This provides a flexible way to model transforms. In some embodiments, downstream applications can choose to implement additional semantics for querying revisions of a dataset to take advantage of type information and custom metadata.

In various embodiments, the data lineage system is separate and abstracted from data, code storage and computational resources required for executing data transformations being modeled. Instead, the model id updated to track references to externally managed resources and identify relationships between those resources. In this way, the data flow model allows for the data lineage system to be generic and applicable to a wide range of potential applications and flexible to operate independently from newly constructed and existing legacy systems.

Figure 4:
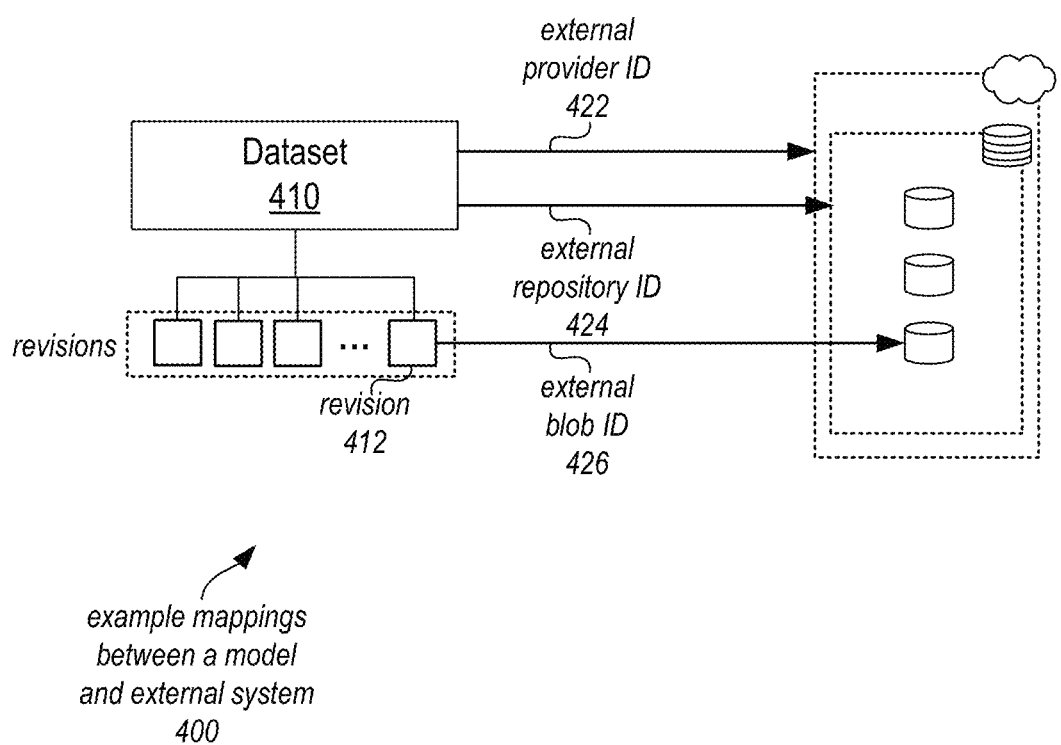
FIG. 4 illustrates example mappings between a model and external system, according to some embodiments.

FIG. 4 illustrates example mappings between a model and external system, according to some embodiments. As indicated at 400, relationships between a lineage data system and external data storage system are illustrated. For instance, dataset 410 may have an external provider ID 422 that maps to, for example, a provider network or system for a data store, an external repository ID 424 that maps to a data store (e.g., a data storage service implemented on the provider network), and a mapping between a revision 412 of dataset 410 and the location and/or identifier of the data itself, such as external bloc ID 426 (which may be one of multiple data objects stored in the data store. While being applicable to all entities tracked by the data lineage system, the concept of storage abstraction is use for the data layer of data flows. For instance, a great number of digital data storage systems are available. Being able to efficiently operate with all of those different storage systems may require a well-defined way of mapping the data storage system into a model in the data lineage system.

Figure 5:
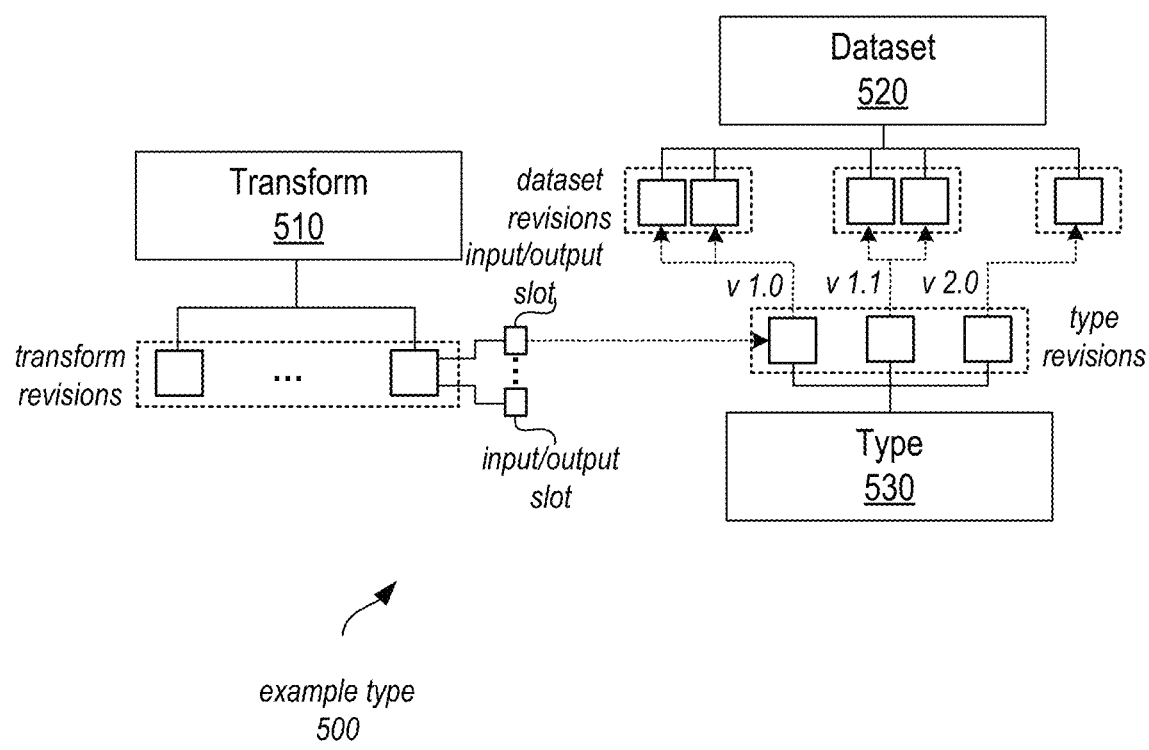
FIG. 5 illustrates an example type object, according to some embodiments.

In various embodiments, data evolution and the process of registering new revisions may be associated with the iteration on data formats (or data types) that a host application natively understands and operates with. The data flow model may account for differences in data formats by supporting data formats to be tracked and versioned through concepts of a type and type revision, as illustrated in FIG. 5. In this way, types and type revisions can logically complement datasets and dataset revisions. In various embodiments, a type entity acts as a logical container of data formats represented by a type revision.

For example, FIG. 5 illustrates an example type entity, according to some embodiments. As indicated at 500, illustrations are depicted of relations between types, datasets and transform slots. Type revisions, such as type revisions v 1.0, v 1.1, and v 2.0 of type 530, may be reusable objects and could be referred to by multiple datasets, such as the various dataset revisions of dataset 520. References to those types may be propagated throughout the graph of dataset revisions automatically by being associated with input and output slots of respective data transforms, such as input/output slots of transformation 510. Type information, as it propagates through the system, can be used by applications for in depth analysis of data and its evolution.

While being able to record type information, that data lineage system may be unable to interpret types, in some embodiments. Type definitions that can be optionally associated with type revisions, may be treated by the model as opaque data, in such embodiments. This approach may also manifest itself in the lack of subtyping available for dataset entities. The data flow model for the lineage data system may not implement subclasses of datasets narrowly focused on a specific data structure or a use case (key-value store, parameters bag, etc.), in some embodiments. In this way, the separation defined between data lineage, data storage systems and a host application tying those things together can be preserved. However, by implementing types in the data flow model, applications equipped with type awareness can run queries against the model to determine and ensure compatibility of datasets and transforms, perform deeper analysis of the data, among other operations.

In various embodiments, a data flow for a data stream can be modeled according to the data flow model discussed herein. For instance, the state of a data stream may not be captured or managed directly by the data lineage system but rather may be observed by the data lineage system through slices (e.g., time, range or key-based) and/or compaction snapshots. In various embodiments, snapshot extraction and slicing may be controlled by application logic and may not necessarily be prescribed by the data flow model. Instead, in such embodiments, the data flow model may assume that sufficient information regarding the status of the steam at the moment of snapshot extraction can be captured by the application in a system-specific manner and recorded in the snapshot dataset. A sequence of such point-in-time snapshots may be represented in the form of dataset revisions. This information can be later used for lineage tracing, in some embodiments. In some embodiments, the stream processing logic described above may be applicable to a wider range of input sources of data. Those include, but are not limited to, relational databases, key-value stores, web content being scraped, user input accepted by upstream applications, among others.

Figure 6:
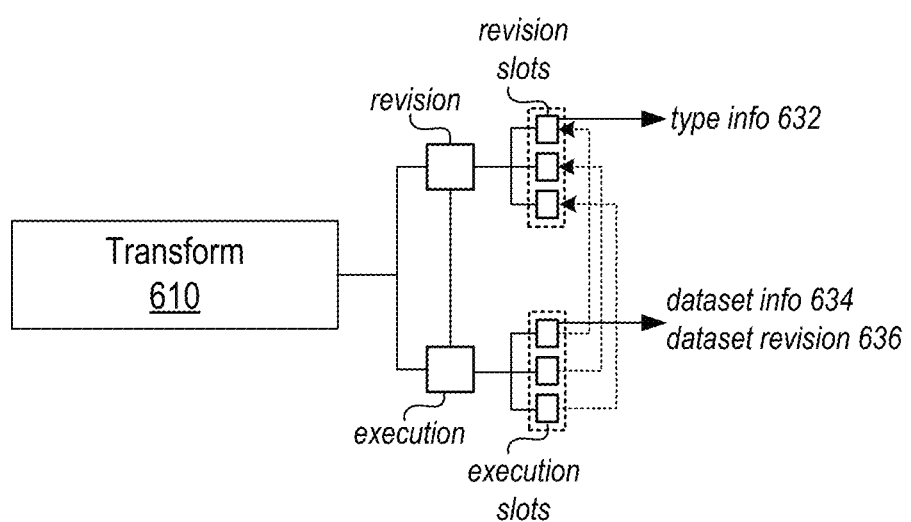
FIG. 6 illustrates an example transform object, according to some embodiments.

In various embodiments, a transform may be another entity or object of the data flow model for system-independent data lineage systems. A transform may represent a portion (or all) of logic interacting with none, one or many datasets registered on the data lineage system. FIG. 6 illustrates an example transform object, according to some embodiments. As the implementation of a transformation (e.g., the software and/or hardware implementing the transformation) evolves, the changes of the transformation changes may be recorded in the form of transform revisions, in some embodiments. For example, transform 610 in FIG. 6 may include a revision (as well as revision slots). In various embodiments, a revision may be logically equivalent to a commit made in external source version control system and points directly at it. As discussed below with regard to FIG. 15, transform revisions can be leveraged for data lineage analysis.

In various embodiments, actual binding between transforms and datasets may be implemented via an additional indirection level—transform slots. A responsibility of slots may be to identify the role a particular dataset revision plays within transform execution. Slots may be defined and initialized with various properties at both revision and execution levels as illustrated in FIG. 6. Revision-level slots may be typed (identify data format that revision expects to see as an input on that slot or produces as an output, as indicated at 632). Execution-level slots may be filled in with a reference to specific dataset revision (produced or consumed), as indicated at 634 and 636.

In various embodiments, transforms may refer to external source version control system for storage of its revisions in the form of commits. Transform revisions may be treated as a list (vs. a tree intrinsic to most software version control systems) which may be sufficient for data lineage tracking purposes, in some embodiments. Such separation may provide the ability to leverage existing infrastructure used for organizing a software development life cycle.

In various embodiments, transform execution comes into play when transform is run. Executions may incorporate runtime properties of transform revisions. While revisions may provide static description of a transform, executions may bind dataset revisions a transform operates with. In some embodiments, revision slots do not record any reference to a specific dataset/revision part, providing a clear indication of the principle that the data flow model is focused on the ability to record changes occurring in the extraneous runtime environment and neither predicts nor dictates the behavior of an external live system.

In various embodiments, tracing properties of transforms (or transform revisions) may provide dimensions all transforms can be evaluated on for the purpose of better understanding of the rules of data propagation throughout the data flow being modeled. Tracing properties may define behavioral aspects of transforms, providing high-level view into a system's internals that can be achieved without a deep analysis of implementation details (which may not always be feasible).

In various embodiments, a number of properties for tracing may be implemented. For example, in some embodiments deterministic tracing properties may be considered. Common non-deterministic factors of a system may include random generators (controlled via programmatically set seed), dependent libraries, hardware (e.g. GPUs). These factors can contribute to the execution of the same transform revision with the same input producing different output data. Additionally, transform developers can choose to identify the level of non-determinism based on the significance of variance that can occur among transform executions, in some embodiments. The impact of non-determinism can range from statistically insignificant to completely unpredictable. The understanding of this property may be useful in projection and analysis of reproducibility.

Another property for tracing may include reversible transforms. Possessing reversible transforms may perform data manipulation that is completely or partially reversible, such that output data products can be used to reproduce, simulate or otherwise expose the nature of input datasets. Examples of non-reversible transformations may include various hashing algorithms, data profiling, metrics calculation, among others, in some embodiments.

Another property for tracing may include privacy preserving. Due to the importance for applications to honor and properly manage privacy of various actors, privacy preserving transforms may be identified. A variety of techniques may be implemented that can be used as flags under this general property. Some of those are anonymization, personal information reduction (PII, PCI, PHI, etc.), and differential privacy, among others.

Another property for tracing and transforms may be generative transforms, in some embodiments. Generative transforms may produce new data (based on its input or even with the lack thereof). Data produced by generative transforms may not contain elements of input datasets and may be generated by the rules described at code level. In some embodiments, generative transforms can, however, produce data based on templates or some other definitions provided externally.

The above tracing properties (and others introduced by downstream applications) can be leveraged when implementing traceability algorithms for answering questions whether tracing should continue through the specific transform or it can be considered terminal point of traversal, in some embodiments. The tracing properties discussed here can be manually specified and may not easily provable. Transform developers may summarize a transform's behavior in such a manner and indicate ambiguity where it exists. Some of these properties may exist in the grey areas of determinism and reversibility and in combination with a lack of formal provability, present challenge for unconditional reliance upon them. However, tracing features can provide an optimization and approximation mechanism for evaluation of data processes in large data ecosystems that are not easily understood otherwise.

As a safety measure applications can choose to implement regression tests and runtime monitoring systems that are continuously tracking the validity of transform properties. Even though most of these properties are not formally provable, some can be validated empirically, in some embodiments.

In various embodiments, data processing flows may include more than one transform. For instance, more often than not data goes through a number of processing steps until it reaches its final form. The sequence of those executions and relationships between resulting data products may present a high value for subsequent analysis. Therefore the data flow model for system-independent data lineage systems may include a flow object to capture static structure of a multi-step data flow, corresponding flow revision for tracking changes in such a formation, and flow execution to record dynamic relations established at run time, in some embodiments.

Figure 7:
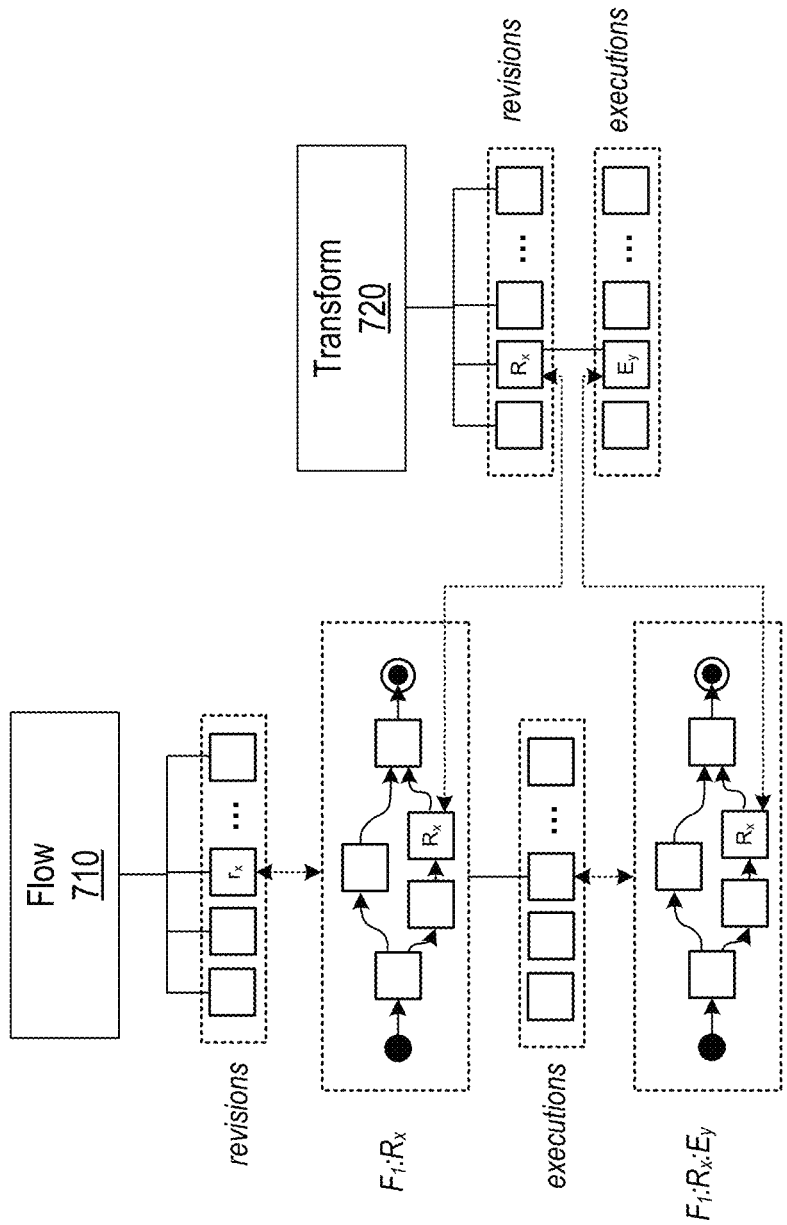
FIG. 7 illustrates an example flow for a model, according to some embodiments.

As illustrated in FIG. 7, flow revisions of flow 710, may contain a complete definition of a flow (as well as reference to external system formally managing flow instance) referring to transform revisions tied together in a directed graph. FIG. 7 illustrates an example flow for a model, according to some embodiments. Example flow 710 illustrates the mechanics of flow execution as it relates to the execution of transformations it consists of. Flow execution may record the sequence and details of operations performed when a particular revision of the flow is being run. Flow executions may contains the log of all transform executions invoked as a part of it, such as executions and revisions of transform 720.

As a tracked system grows in size, observing groups of entities as those relate to each other while performing similar functions or as those belong to the same subsystem may be implemented in some embodiments. The feature of grouping may be introduced as a layer on top of the entire model allowing any set of entities to be combined together. Entities (and groups itself) can participate in a number of such formations allowing large models to be broken down into much smaller, better observable and trackable units, in some embodiments.

At a lower level, applications can make use of grouping for managing data primitives broken into a collection of otherwise independent datasets, in some embodiments. Use cases like that can arise when datasets (or other entities) are created on-the-fly with subsequent need for being addressed using a certain query semantics (e.g. sliding window). Grouping those together may provide a formal mechanism for running such queries.

Hierarchical grouping capabilities may have implications for data cataloging. For example, using grouping semantics in this connotation may enable designers to combine high- and low-level information about the system in a single consistent location. A dataset grouping paradigm can enable efficient data discovery, spread awareness, and boost adoption, in some embodiments.

FIG. 8 illustrates an example data flow model for data lineage, according to some embodiments. A reference of the exemplary embodiment of data flow model is described in various tables below that correspond to different features of example data flow model 800. For example, an entity may be a base class for other primitives described below in Table 2, according to some embodiments.

TABLE 2

| Key | Name | Description |
| --- | --- | --- |
| pk | id | Unique identifier. |
|  | deprecated | Indicates that the entity has been deprecated and reliance on it should no longer be extended. Transform maintainers should be investing into ongoing effort of migrating off deprecated dependencies. This property can be optionally accompanied with termination SLA. |

A type object may be used to represent a data format (as noted above). Types may act as containers of type revisions. Table 3 may be a type reference, according to some embodiments.

TABLE 3

| Key | Name | Description |
| --- | --- | --- |
| ek (External Registry) | external_registry_id | Reference to external registry containing type definitions. |
|  | name | Type name. |

A type revision may be specified according to table 4 below, in some embodiments.

TABLE 4

| Key | Name | Description |
| --- | --- | --- |
| fk (Type) | type_id | Parent type identifier. |
| ek (External Type) | external_type_id | Type revision identifier in external registry. |
|  | backwards_compatible | Indicates whether revision preserves backwards compatibility of the format. |
|  | version | Human-readable type version (e.g. "1.0", "1.2.3", "2.1"). |

A dataset may be described as a single, indivisible piece of data tracked by a data lineage system, in some embodiments. Table 5, specified below, provides an example dataset reference, according to some embodiments.

TABLE 5

| Key | Name | Description |
| --- | --- | --- |
| fk (Type) | type_id | Data type identifier. |
| ek (External Provider) | external_provider_id | Identifies external provider where dataset is stored |
| ek (External Repository) | external_repo_id | Identifies repository name (e.g. bucket name). |
|  | name | Dataset name. |

A dataset revision may be specified according to the example reference in Table 6, according to some embodiments.

TABLE 6

| Key | Name | Description |
| --- | --- | --- |
| fk (Dataset) | dataset_id | Identifies parent dataset. |
| fk (Type Revision) | type_revision_id | Identifies data type revision. |
| fk (Transform Execution Slot) | transform_execution_slot_id | Identifier of output slot of transform execution that produced the revision. |
| ek (External Source) | external_source_id | Identifies external source of imported dataset revisions. The field is applicable to revisions registered outside of the scope of a transform execution. |
| ek (External Blob) | external_blob_id | Identifier of dataset stored within external repository (e.g. blob identifier or bucket prefix). |

A transform may be specified according to the example reference in Table 7, according to some embodiments.

TABLE 7

| Key | Name | Description |
|---|---|---|
| ek (External Provider) | external_provider_id | Identifies external source version control system |
| ek (External Repository) | external_repo_id name | Identifies specific code repository. Transform name. |

A transformation revision may be specified according to the example reference in Table 8, according to some embodiments.

TABLE 8

| Key | Name | Description |
|---|---|---|
| fk (Transform) | transform_id | Identifies parent transform. |
| ek (External Commit) | external_commit_id | Identifies commit in external system. |
| | tracing_properties | Bag of properties hinting various aspects of data propagation through the transform. |
| | comment | Summary of the changes introeuced by the revision. |

A transform slot may be associated with revisions and record structure and format of input and output data transform revision operations, according to some embodiments. In some embodiments, a transform slot may not refer to data products directly. A transform slat may be specified according to table 9, according to some embodiments.

TABLE 9

| Key | Name | Description |
|---|---|---|
| fk (Transform Revision) | transform_revision_id | Identifier of parent transform revision. |
| fk (Type Revision) | type_revision_id | Revision of the data format the slot operates with. |
| | name | Slot name. |
| | direction | Separates input and output slots. |

A transformation execution reference may be specified according to Table 10, according to some embodiments.

TABLE 10

| Key | Name | Description |
|---|---|---|
| fk (Transform Revision) | transform_revision_id | Identifies transform revision being used. |
| fk (Flow Execution) | flow_execution_id | Identifies flow execution this execution is recorded as a part of. |

A transform execution slot may be populated with additional runtime properties, in some embodiments. Dataset revision affiliation may be established and recorded at this level. A transformation execution slot may be specified according to Table 11, according to some embodiments.

TABLE 11

| Key | Name | Description |
|---|---|---|
| fk (Transform Execution) | transform_execution_id | Identifies transform execution. |
| fk (Transform Slot) | transform_slot_id | Identifies transform revision slot. |
| fk (Dataset) | dataset_id | Identifies dataset transform execution interacted with. |

TABLE 11-continued

| Key | Name | Description |
|---|---|---|
| fk (Dataset Revision) | dataset_revision_id | Identifies dataset revision (produced or consumed). |

A flow may be computational graph consisting of individual transforms and may be specified according to Table 12, according to some embodiments.

TABLE 12

| Key | Name | Description |
|---|---|---|
| ek (External Provider) | external_provider_id | Identifies external flow definition system (e.g. AWS Step Functions, Apache Airflow). |
| ek (External Flow) | external_flow_id | Flow identifier in the external system. |
| | name | Flow name. |

A flow revision may refer to the specific revision of a flow. Revisions may store flow definitions and may be used to keep track of changes occurring within those flows, in some embodiments. A flow revision may be specified according to Table 13, according to some embodiments.

TABLE 13

| Key | Name | Description |
|---|---|---|
| ek (External Revision) | external_revision_id definition | Identifies parent flow. Flow definition is provided for completeness to incorporate proper mapping between internal and external transform identifiers. |

A flow execution may be specific to the execution of the flow revision and may be specified according to Table 14, according to some embodiments.

TABLE 14

| Key | Name | Description |
|---|---|---|
| fk (Flow Revision) | flow_revision_id | Identifies flow revision being invoked. |
| | definition | Contains overview of the execution log with references to involved transform executions. |

A group may be layered on top of a model and can be used to relate a set of other entities that belong together, in some embodiments. A group may be specified according to Table 15, according to some embodiments.

TABLE 15

| Key | Name | Description |
|---|---|---|
| fk L(Entity) | items | The list of items marked for inclusion in the group. |

An identity may represent an actor being tracked in the external identity management system, in some embodiments. An identity may be specified according to Table 16, according to some embodiments.

TABLE 16

| Key | Name | Description |
| --- | --- | --- |
| ek (External Provider) | external_provider_id | Identifier of external identity provider. |
| ek (External Actor) | external_actor_id | Identifier of actor within provider space. |

A transaction may be used for recording lineage model changes and may be specified according to Table 17, according to some embodiments.

TABLE 17

| Key | Name | Description |
| --- | --- | --- |
| fk (Identity) | identity_id | Refers to identity used to execute transaction. |
| | timestamp | Moment in time when transaction is committed. |
| | additions | The list of additions introduced by the transaction. |
| | modifications | The list of modifications introduced by the transaction. |
| | removals | The list of removals introduced by the transaction. |

FIG. 9 illustrates an example of grouping semantics 900 for a data flow model, according to some embodiments.

A data flow model may be changed, in various scenarios. New or updated transforms (or flows) may be ran, new datasets added, types registered, or other changes. A data lineage system may record changes occurring in a live application, in various embodiments. Most of such changes may either occur simultaneously or have cause-effect relationship which justifies those being added to the model all at once. In order to facilitate this type of change, transaction which groups together a set of model modifications and applies those to the model may be utilized, in some embodiments.

A transaction may include an independent list of entities being added, modified and removed along with some metadata added for auditability, in some embodiments. A transaction proposal mechanism (e.g., discussed below with regard to FIG. 22) may allow applications to define the level of granularity appropriate for a specific use case (e.g., a transaction size can vary from one item to thousands based on the scale of the system and required detailization level), in some embodiments.

In various embodiments, transaction semantics may enable an additional level of auditability by introducing a concept of a change log (e.g., change log 234) to record modifications made to a model. An example indicated at 700 in FIG. 7 renders side by side the list of transactions made (underneath the timeline) and point in time snapshots of the system at the moments immediately following those commits with transaction effects highlighted (above the timeline). For example, timeline visualization 1000 illustrates when, at 1010, a dataset, type, and transform are added to the model. Then, as indicated at 1020, a transform revision and type revision may be added and associated with an output slot. Then, as indicated at 1030, a transform execution and produced data set revision may be added. At 1040, an additional execution and revision may be added to the model.

In various embodiments, a transaction log may provide a level of abstraction for implementing another feature of the data flow model—identity management. The concept of identity may be introduced at transaction level and allow applications to record runtime access details along with each committed transaction, in some embodiments. Identity information may be recorded as a part of the transaction log and may provide insight for the purposes of security and compliance auditability.

In various embodiments, an identity object may be associated with each transaction that can be adopted for aggregating all of the properties of a surrounding runtime environment. Host applications can choose to separate and record committer identity independently from executor identity, in some embodiments. Additionally, properties of respective software systems can be recorded in addition to the identity of authenticated agents (software versions, runtime information, etc.), in some embodiments.

The identity of a committer may be recorded along with each transaction and may not follow the thread of verification process that needs to be put in place to ensure correctness of metadata identity entity is populated with, in some embodiments. Applications can choose to adopt stronger enforcement paradigm and integrate one of federated authentication mechanisms to eliminate the possibility of maliciously formed transactions to be committed, in some embodiments.

Formalizing data flow in a complex environment of a large (or even medium-sized) organization may be implemented, in some embodiments. The use of higher-level abstractions in the form of groups or organizational units can introduce proper structure needed to formalize relations between departments of real-world organization. In this paradigm actors participate in data exchange as producers or consumers of data products. The use of such instruments in combination paints bigger picture of data ecosystem established within organization units.

Figure 11:
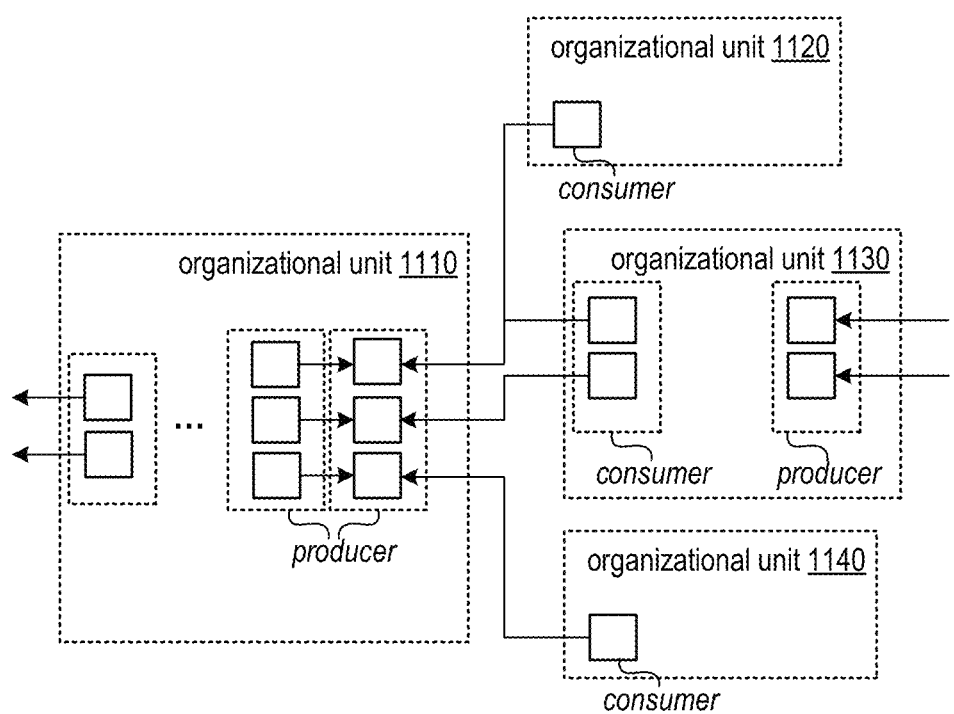
FIG. 11 illustrates example organizational units for scaling data flow models, according to some embodiments.

FIG. 11 illustrates example organizational units for scaling data flow models, according to some embodiments. The example organizational units at 1110, 1120, 1130, and 1140 may be for a data producer-consumer model as it scales along with organization size.

Figure 12:
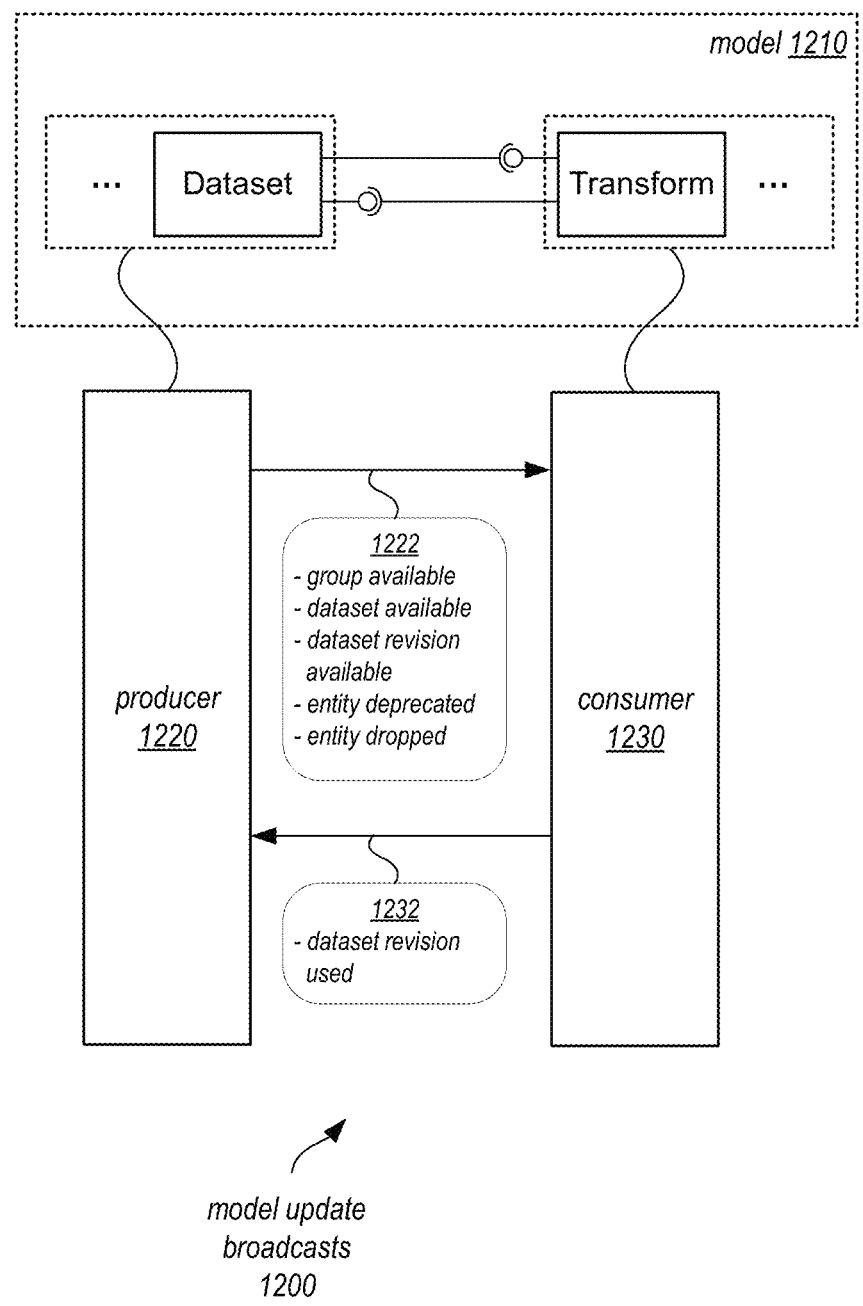
FIG. 12 illustrates example messaging for broadcasting updates to a model, according to some embodiments.

In various embodiments, messaging may be introduced between actors allowing them to efficiently exchange updates regarding data feeds available within an organization. FIG. 12 illustrates example messaging for broadcasting updates to a model, according to some embodiments. A message exchange may support the notion of data product and transform deprecation which acts as a mechanism for an organization to move forward as data becomes obsolete, needs to be cleaned up or removed for compliance reasons, in various embodiments. For example, for model 1210 with a dataset and transform corresponding to producer 1220 and consumer 1230 respectively, a producer 1220 can broadcast or otherwise information 1222, such as when a group is available, when a dataset is available, when a dataset revision is available, when an entity is deprecated, and when an entity is dropped. In some embodiments, a consumer 1230 can send a notification of when a dataset revision is used. Broadcast of information may be provided to registered set of recipients with the model, in some embodiments. Host applications can extend the protocol and entity definitions with domain-specific lexicon to implement custom business logic and support internal processes (e.g. use tagged datasets within entity groups to enable filtering and data feed subscriptions within the organization), in some embodiments.

As noted above, a data flow model for system-independent data lineage systems can provide support for various types of analyses based on the ability to establish a relationship of data to its ancestors and descendants (referred to as a data lineage). In some embodiments, forwarding tracing may be implemented. Forward tracing may be useful when a particular dataset revision or input needs to be traced to all of its consumers. Such operations are common when dealing with sensitive data and compliances (e.g. GDPR).

Figure 13:
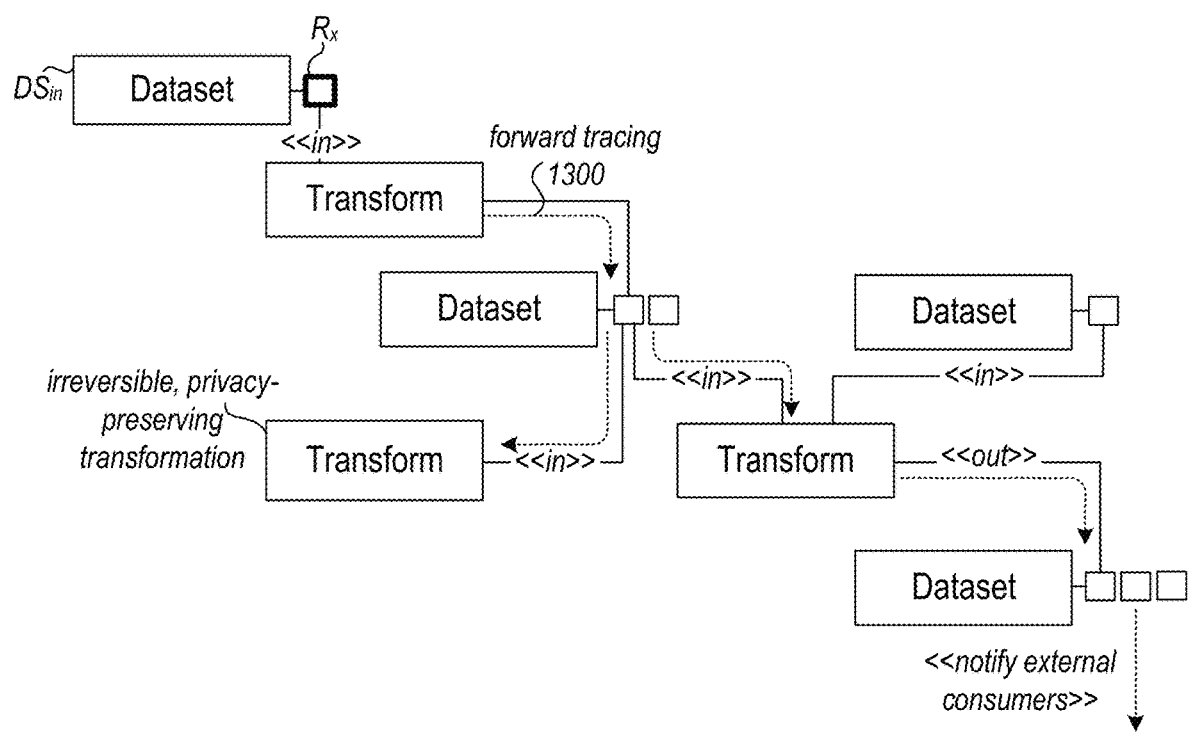
FIG. 13 illustrates an example of model forward tracking, according to some embodiments.

To illustrate forward-tracing in action, we consider the forward racing 1300 in the scenario illustrated at 1300 in FIG. 13 where revision DSin:Rx goes through the chain of transformations and as a result leaves the trace consisting of a number of derivative data products. The result of such traversal may provide a list of dataset revisions being direct ancestors of DSin:Rx produced by all transforms dependent on it, in some embodiments. Note that as involved transforms are being executed over and over again, each respective level of virtual dependency tree grows wider, in some embodiments.

In various embodiments, a tree of data dependencies can often grow huge in case of successful and very commonly used data products. Downstream application can choose to rely on transform properties indicating whether traversal should continue through it (with the aim of narrowing down the scope of the traversal) or to perform unconditional search throughout the entire hierarchy. Marking transforms as irreversible and privacy-preserving can reduce complexity of search inquiries, in some embodiments. At the same time the correctness of these properties may not be strongly enforceable and easily provable.

The ability to track a dataset to its origins arises too in backward tracing. This ability may be useful for experiment reproducibility which proves to be essential in the field of machine learning and a number of domains where frequent experimentation is an integral part of the process (medicine, biology, physics, etc.), in various embodiments.

The other important application of backward tracing may be the analysis of ascendants of a particular data revision in general or direct ascendants belonging to a specific dataset in particular. This use case powers dependency management, data changes effect analysis, in some embodiments.

Figure 14:
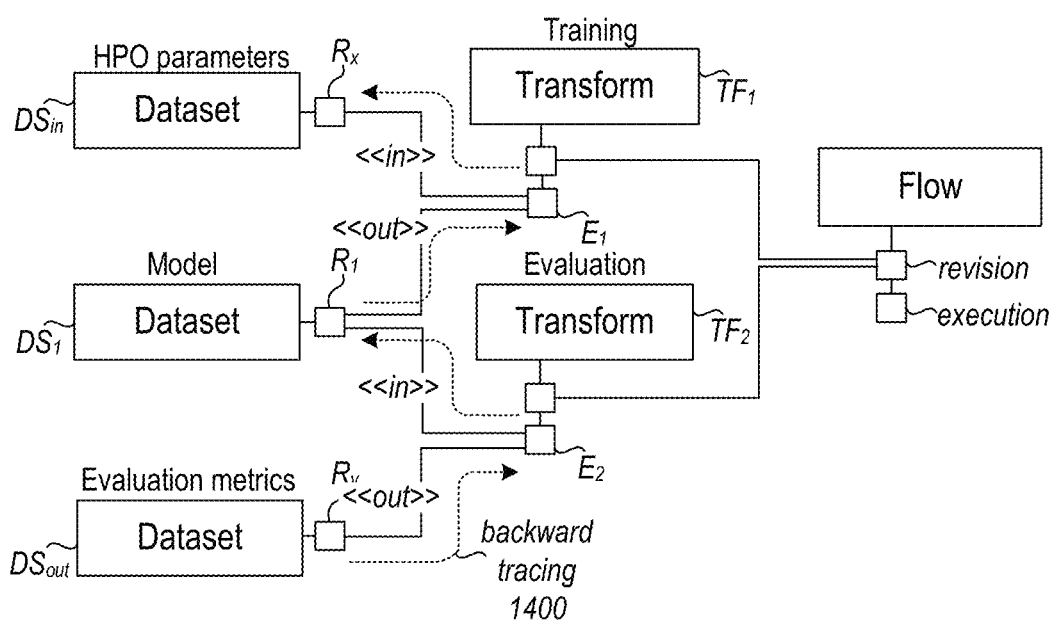
FIG. 14 illustrates an example of model backtracking, according to some embodiments.

For a quick illustration, let's consider a simple example as illustrated in FIG. 14 as of two-stage machine learning flow, as indicated at backward tracing 1400 consisting of training (T F1) and evaluation (T F2) transforms. In this example initial dataset DSin containing training parameters is consumed by T F1 which produces the model persisted in DS1. Subsequently model evaluation performed by T R2 produces metrics stored in DSout. In case if specific set of metrics produced by T F2:E2 needs to be analyzed, lineage of dataset revision DSout:Ry can be traced back to a specific ancestor from dataset DSin:

Ancestors(DSout:Ry,DSin)=L(DSin:Rx)

The only route can be found between those two revisions of interest:

LineageRoute(DSout:Ry,DSin:Rx)=L([TF1:E1,DS1:R1,TF2:E2])

In various embodiments, both Ancestors( ) and LineageRoute( ) functions can provide zero to many items in response.

Backward and forward tracing on a model can be used for the analysis of causal relationships between code and resulting data changes, in some embodiments. The need for such type of analysis may appear during evaluation, debugging, and troubleshooting of software components. The ability to efficiently pinpoint a change, resulting in the appearance of observed data phenomena, in the code proves to be of significant value to system maintainers, in some embodiments.

Figure 15:
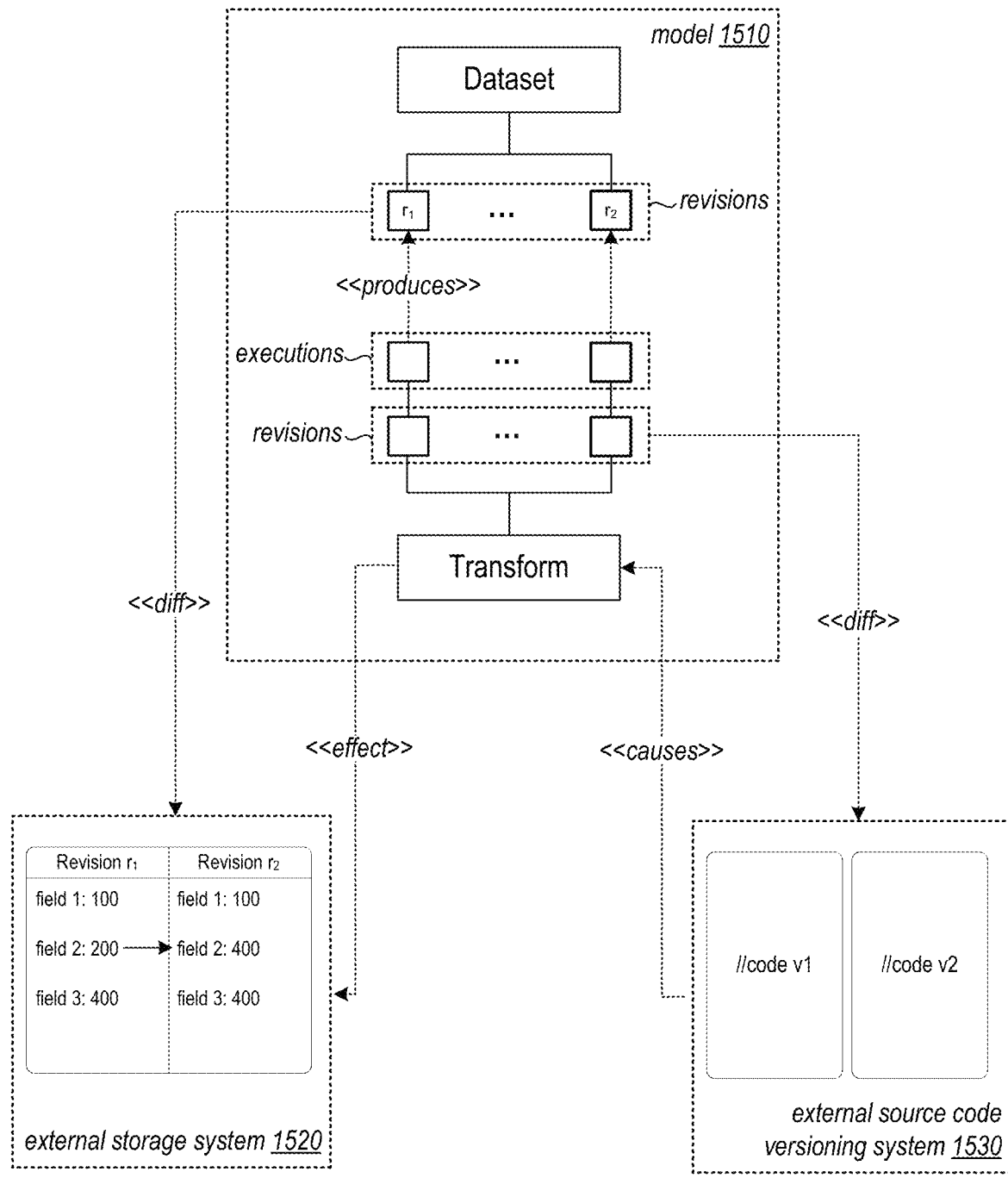
FIG. 15 illustrates an example code change visualization, according to some embodiments.

The interface may support various communications between a data lineage system and external application. FIG. 15 illustrates an example code change visualization, according to some embodiments. In a scenario like example visualization 1500, application leverages external tools for analysis and visualization of code, data state, and changes. Data lineage system may implement model 1510 which may be used for performance and reference tracking—tying things together and maintaining relationships. Example 1500 illustrates the impact a specific code change (from v1 to v2 at external source code versioning system 1530) makes on the result in the metric of interest (from revision $r_1$ to revision $r_2$ in external storage system 1520). In the example 1500 presented here, transform and dataset are linked directly (transform executions produce revisions of the dataset). In other embodiments, those can be separated by multiple layers preserving the same ability to track changes as those propagate through the system.

Figure 16:
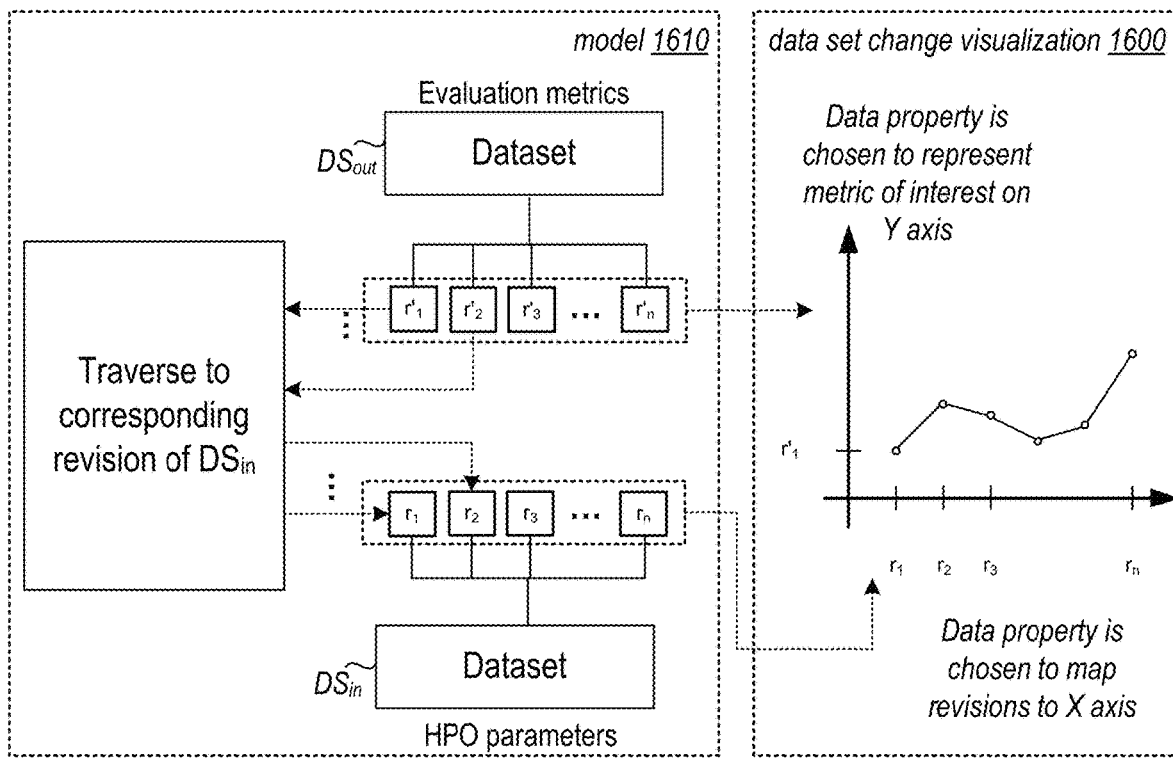
FIG. 16 illustrates an example dataset change visualization, according to some embodiments.

As an extension of the example reviewed above, trend analysis can be performed with the help of tracing capabilities provided by the model, in some embodiments. A scenario where a set of model training parameters affects evaluation metrics of the model trained by a multi-step workflow may be considered. FIG. 16 illustrates an example dataset change visualization, according to some embodiments.

A number of important concepts are illustrated in this example of data set change visualization 1600 for model 1610. A tracing algorithm (e.g., forward or backward) may be used for establishing relationships between dataset revisions of DSin and DSout. Once those are established, application interprets data associated with DSout revisions for analysis (which in this case in the visualization) of the effect changes in HPO parameters make.

In some scenarios, external systems can leverage from its data format and meaning awareness capabilities and tooling (visualization, alerting) for creating complex workflows powered by causal relationships extracted from lineage layer. The recent rise of machine learning techniques (in areas of vision and natural language processing, to name a few examples) has resulted in the evolution and appearance of the whole range of data processing workflows (data programming, code-as-supervision, federated learning). Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time. The efficiency of adoption of machine learning tools, being data hungry processes by nature, may be defined through the ability to organize and properly manage data used for training and evaluating machine learning models.

Figure 17:
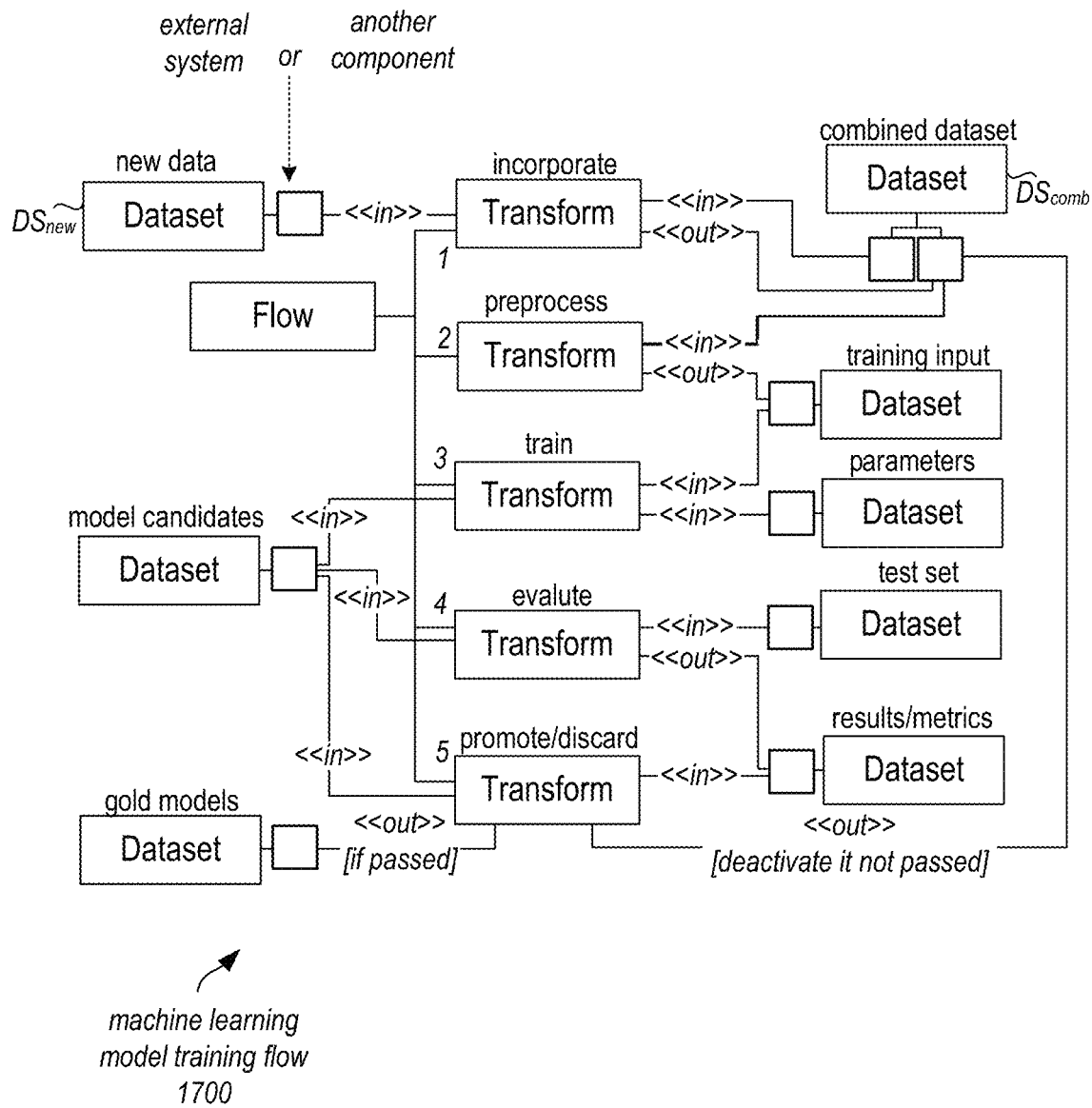
FIG. 17 is an example machine learning model training flow, according to some embodiments.

A data flow model as discussed above may be used to implement a machine learning technique. For example, a simple sequential flow consisting of a set of steps involved into training of models that are considered for production deployment may be evaluated. FIG. 17 is an example machine learning model training flow, according to some embodiments. The flow 1700 illustrated in FIG. 17 demonstrates how a stream of newly labeled data (tracked within DSnew) is being merged into combined dataset (DScomb which is used for training and further validation of a model). A newly trained model is being promoted to deployment candidate upon successful validation. Alternatively a newly added dump of data is being discarded.

The ability to freely experiment and iterate on a data flow model (e.g., according to the data flow model described above), as well as to iterate on parameters for transformations (e.g., training techniques) and datasets (e.g., training data) may beneficially impact the pace and efficiency of machine learning research. For instance, the data flow model can be used to establish dependencies between data products and applied transforms which can be beneficial for developing machine learning systems. In this example, every piece of data being operated by this flow is being tracked in the form of dataset revision, which, in conjunction with recording invocations of all pieces of logic as transform executions, allows following its lineage all the way through in both directions of inputs used and outputs produced.

In addition to traceability itself, the above data flow model allows for reconstructing a complete lineage of data and transforms involved in the production of a specific modeling artifact. The development of any machine learning product may depend on the ability to reproduce and iterate on the results of a particular experiment (granted that a lot of factors mentioned previously are contributing to some of the key components of it being non-deterministic by nature).

Applications may operate with data materialized in a number of forms including: streams, relational tables, key-value spaces, blob repositories, in some embodiments. Some systems usually involve operating on the boundaries of those modalities constantly shifting data across those to perform specific business functions.

Figure 18:
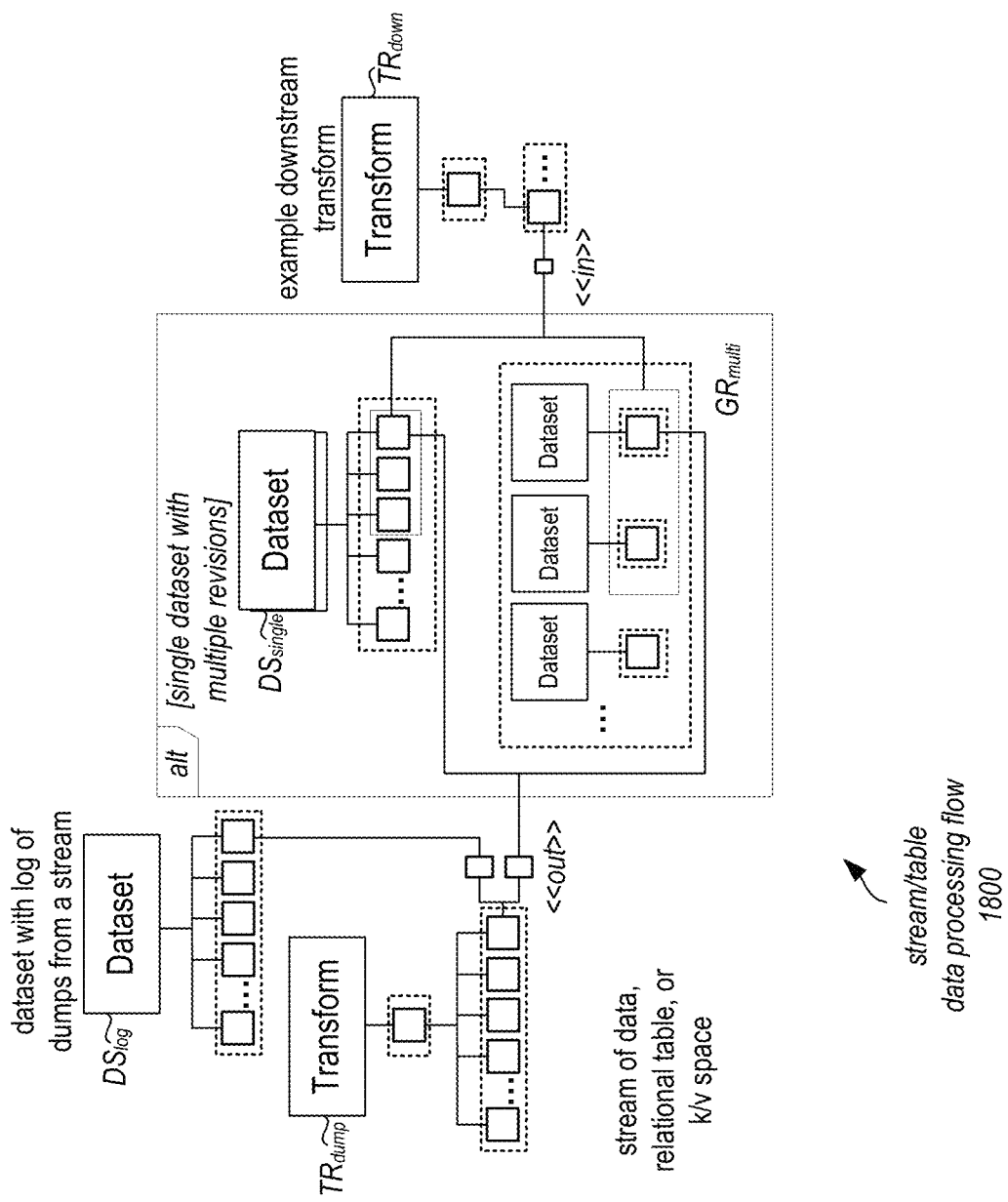
FIG. 18 is an example stream or table data processing flow, according to some embodiments.

FIG. 18 is an example stream or table data processing flow, according to some embodiments. Consider the scenario where a system produces periodic dumps of data from a stream into an object stored (e.g., that provides blob storage) that is being further consumed (with some sliding window) for downstream analysis (as indicated at 1800). This trivial use case involves the collection of some basic metadata associated with each dump ($DS_{log}$ is introduced for this purpose) and dumps itself. Data flow model designers have flexibility of representing dumps with either single dataset containing multiple revisions ($DS_{single}$) or multiple single-revisioned datasets grouped together ($GR_{multi}$). Each execution of downstream transform ($TR_{down}$) refers to a specific subset of those revisions for the analysis it performs. Exact list (or range) of consumed revisions is associated with corresponding execution of $TR_{down}$. As a result, a combination of $TR_{dump}$, $DS_{log}$, $DS_{single}$ (or $GR_{multi}$), and $TR_{down}$ may provide a comprehensive view into the flow of every bit of data as it crosses the boundaries of the original stream and proceeds to downstream components.

Interface 212 as discussed above with regard to FIG. 2 may be implemented in various ways to support interactions with data flow models. In some embodiments, an example overview of proposed approach complete we provide some remarks regarding its public interface and potential integration options.

One of the key concepts of this proposal is the idea that data lineage system itself does not provide neither data storage nor execution environment. The reasoning behind this approach is described in earlier sections. Interfaces of the system are shaped by this decision and focus on recording of data manipulations and performed executions in a passive manner. This leads to two potential integration scenarios that are being explored here.

FIG. 19 illustrates an example of an explicit programming paradigm for using an interface of a data lineage service, according to some embodiments. The interface directly exposed by the system provides low-level and granular access to all of its entities. The reliance on this layer provides the highest level of flexibility at the expense of having highly verbose way of expressing occurring changes, as indicated at 1900.

The snippet makes a number of assumptions regarding input and output structure of the transform being executed for illustration purposes. In practice, calling application will likely populate this information dynamically using embedded self-awareness mechanisms to make sure this reflects its actual state at the moment of recording. The results of snippet execution and the impact it makes on the model are illustrated at 1910.

Figure 20:
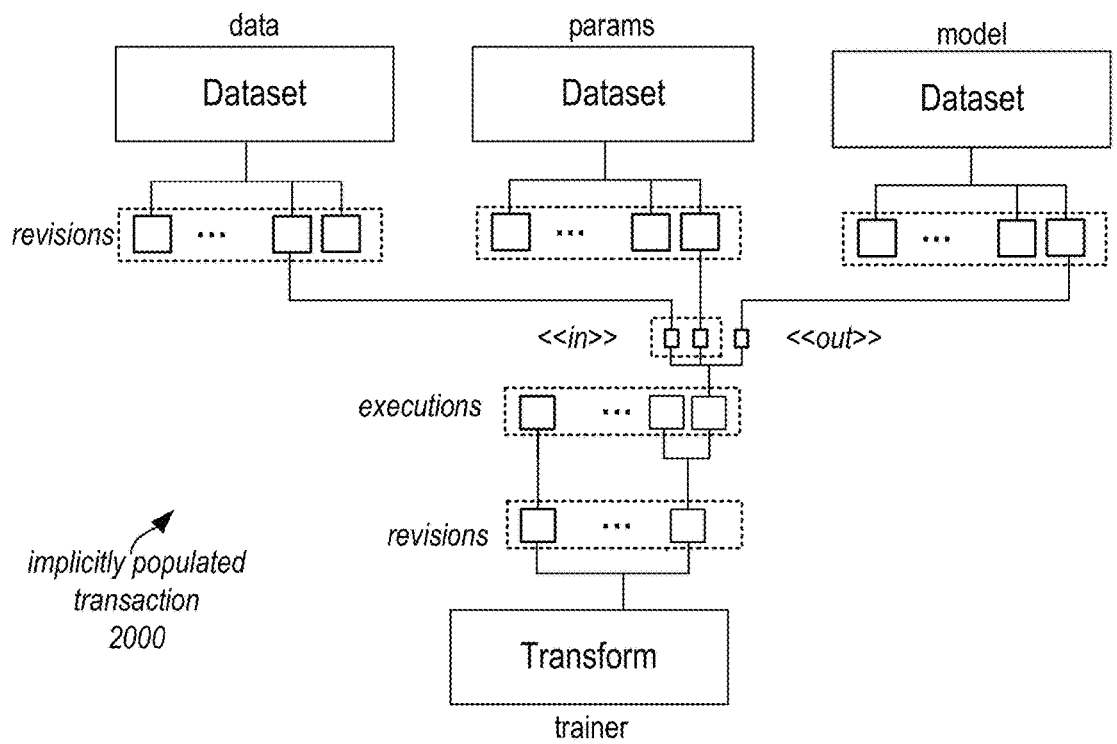
FIG. 20 illustrates an example of an implicit programming paradigm for using an interface of a data lineage service, according to some embodiments.

In some scenarios, data engineers may not explicitly write the code above to record data transformations. Deep integration of the data flow model for a data lineage system may be integrated into APIs used to perform transactions. FIG. 20 illustrates an example of an implicit programming paradigm for using an interface of a data lineage service, according to some embodiments. Building on the foundation of low-level API described above, the impact of deep integration into data storage, processing, and DNN frameworks may be demonstrated. The code indicated at 1900 builds parallel between the code naturally produced during experimentation and tracking logic invoked under the covers. FIG. 20 confirms that the same level of detail is achievable even if tracking subsystem is completely abstracted. As indicated at library integration example 2010, deep integration as demonstrated using a machine learning model training example 2000: the code written by the experimenter (on the left); related snippets of data lineage interface integrated into underlying libraries (on the right), in some embodiments.

This integration method resembles the paradigm of configurable logging currently supported by the majority of software frameworks. In this case the interface of data lineage system is being implemented externally and is propagated by application logic to all of its internal components and underlying frameworks for recording purposes. This approach allows combining seamless experimentation with desired level of traceability and reproducibility.

Although FIGS. 2-20 have been described and illustrated in the context of a data lineage service, the various techniques and components illustrated and described in FIGS. 2-20 may be easily applied to other data lineage systems in different embodiments that may system-independent data lineage system. Stand-alone data lineage systems are an example of another embodiment that may be implemented in private networks or systems to perform similar techniques to those described above. As such, FIGS. 2-7 are not intended to be limiting as to other embodiments of a system that may implement system-independent data lineage modeling, tracking, or analysis.

Various different systems and devices may implement the various methods and techniques described below, either singly or working together. For example, a data lineage service such as described above with regard to FIGS. 2-20 may be configured to implement the various methods. Therefore, the above examples and or any other systems or devices referenced as performing the illustrated method, are not intended to be limiting as to other different components, modules, systems, or configurations of systems and devices.

Figure 21:
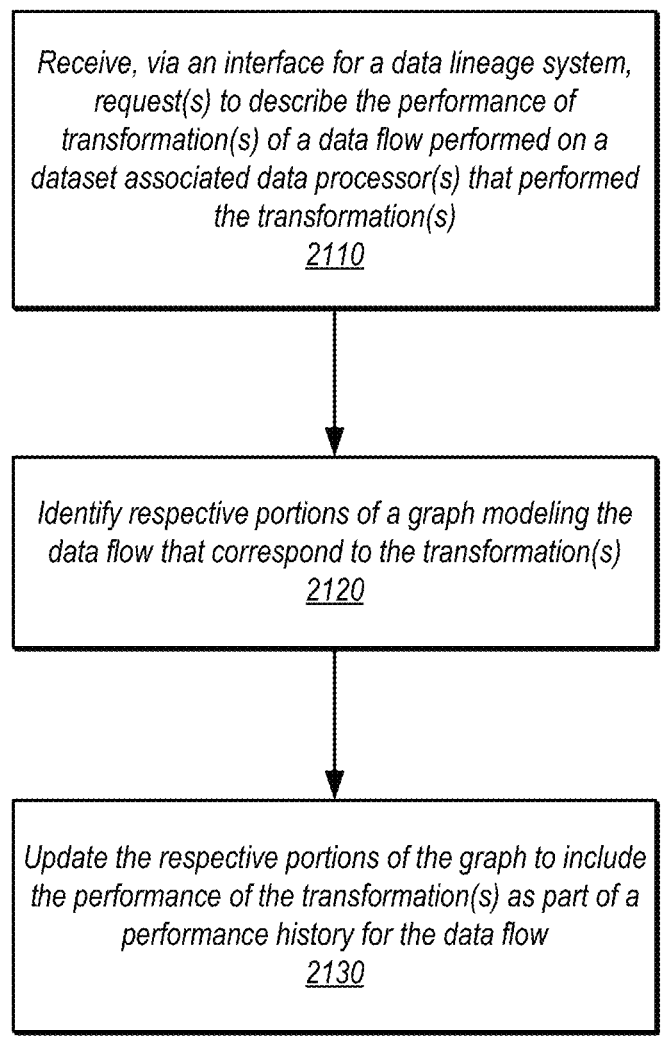
FIG. 21 is a high-level flowchart illustrating various methods and techniques to implement tracking performance history with a graph-based data flow model at a data lineage system, according to some embodiments.

FIG. 21 is a high-level flowchart illustrating various methods and techniques to implement tracking performance history with a graph-based data flow model at a data lineage system, according to some embodiments. As indicated at 2110, one or more requests may be received via an interface for a data lineage system to describe the performance of one or more transformations of a data flow performed on a dataset associated with one or more data processors that perform the transformations, in various embodiments. For example, various requests that are associated data processors may specify or include identifiers for the types, revisions, transforms, data sets, or other objects in the model may be included in the request, as well as various other information (as discussed above with regard to FIGS. 8 and 9). The transformations may be used to model a wide variety of data flows, including machine learning, Extract Transform Load (ETL), data stream processing, complex data publishing or pipelining techniques, among many others. The performance description may include performance metrics, timing information for the execution, and/or other features for later tracing and other analysis that may be implemented by analyzing the data lineage using the model. Data processors may be any system, service, device or application that performs a transformation (any change to or operation on a dataset), including distributed processing systems (e.g., processing clusters) or non-distributed (e.g., single node) data processing applications, in some embodiments As indicated at 2120, respective portions of a graph modeling the data flow that correspond to the transformation(s) may be identified. For example, an evaluation of links or other pointers between nodes or objects in the graph representing different transformations performed in the data flow may be traversed to identify the corresponding nodes, in various embodiments. In some embodiments, a graph database may utilize an identifier (or multiple identifiers) specified in a request to be located using traversal techniques in order to locate the corresponding nodes of the graph.

As indicated at 2130, the respective portions of the graph may be updated to include the performance of the transformation(s) as part of a performance history for the data flow, in various embodiments. For example, the performance history may be represented or captured by the execution objects and their respective relationships with the dataset revisions, type revisions, or other information that can be associated with execution using the data flow model described above. In some embodiments, the updates may be made by requesting the insert of new nodes or attributes on nodes in a graph structure using corresponding graph database APIs, language, protocols, or other instructions.

Figure 22:
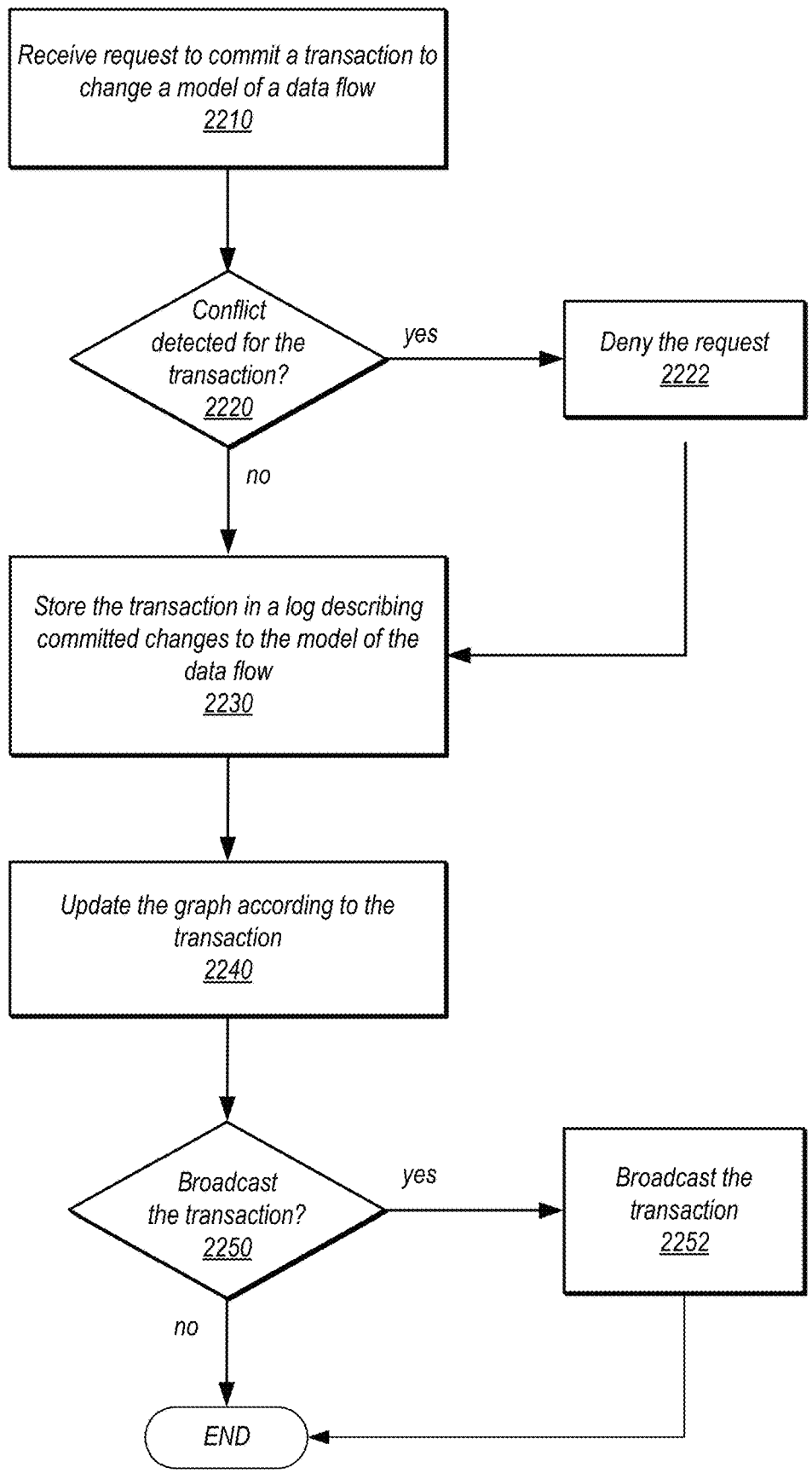
FIG. 22 is a high-level flowchart illustrating various methods and techniques to implement updating a graph-based data flow model at a data lineage system, according to some embodiments.

FIG. 22 is a high-level flowchart illustrating various methods and techniques to implement updating a graph-based data flow model at a data lineage system, according to some embodiments. As indicated at 2210, a request to commit a transaction to change a model of a data flow may be received, in various embodiments. The request may specify one or multiple changes (e.g., to create, add, update, modify, delete, or remove objects, entities, relationships or other features of a model) to be committed as a group. As indicated at 2220, a conflict check may be performed for the transaction. If a conflict is detected, then the updated may be denied, as indicated at 2222, in some embodiments. For example, a conflict can be determined based on comparing with a change in the proposed transaction conflicts with a change to be made by another proposed transaction. In some embodiments, conflicts may be detected using a consensus protocols or voting mechanism that allows actors or other participants which may be As indicated at 2230, the transaction may be stored in a log describing committed changes to the model of the data flow, in various embodiments, as discussed above. As indicated at 2250, the graph may be updated according to the transaction, in various embodiments. A graph database may, for instance, be accessed to update the graph structure according to the committed transaction. In some embodiments, transaction semantics for the graph database may also be used to perform the updates in the transaction.

In some scenarios, it may be determined whether to broadcast the transaction, as indicated at 2250. If yes, then as indicated at 2252 the transaction may be broadcast similar to the information and techniques discussed above with regard to FIG. 12. For example, different recipients may be registered (or discovered) according to identifiers or other indications in the data flow model (e.g., identity objects) to determine whether or not a change should be broadcast and to which recipients (e.g., by search the model for dependent modeled features and their associated identities).

Figure 23:
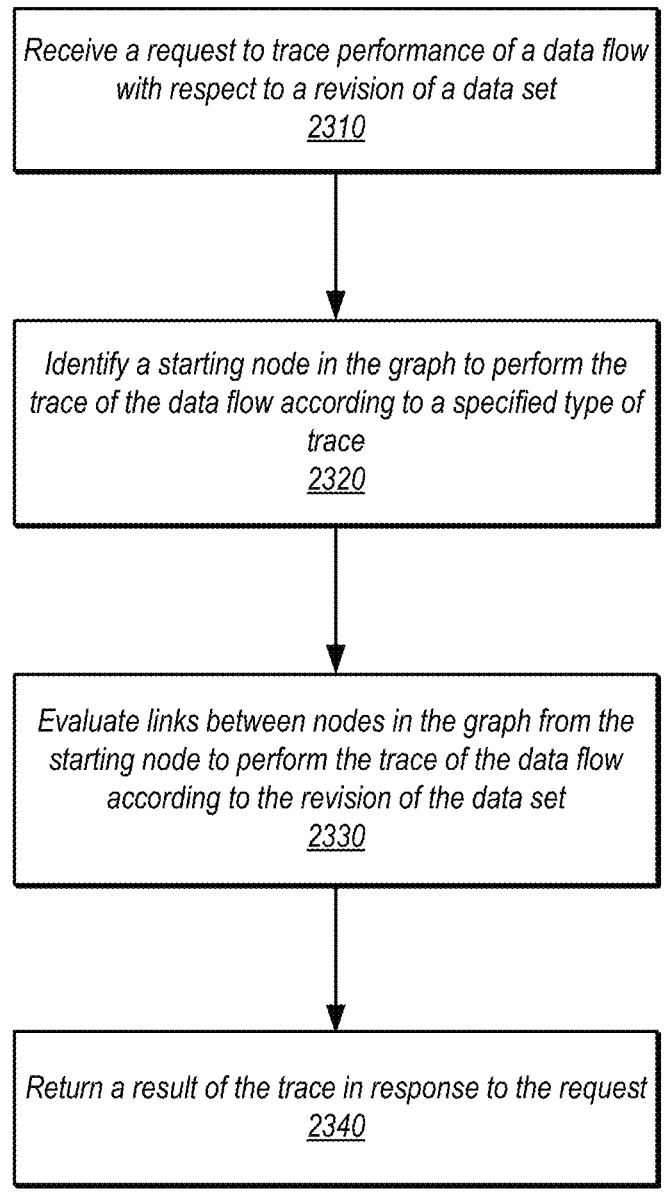
FIG. 23 is a high-level flowchart illustrating various methods and techniques to implement updating a graph-based data flow model at a data lineage system, according to some embodiments.

FIG. 23 is a high-level flowchart illustrating various methods and techniques to implement updating a graph-based data flow model at a data lineage system, according to some embodiments. As indicated at 2310, a request may be received to trace performance of a data flow with respect to a revision of a dataset, according to some embodiments. As indicated at 2320, a starting node may be identified in the graph to perform the trace of the data flow according to a specified type of trace, in various embodiments. For example, forward tracing may be one type of trace, discussed above with regard to FIG. 13, and backward tracing may be another type of trace, discussed above with regard to FIG. 14.

As indicated at 2330, links between nodes in the graph may be evaluated from the starting node to perform the trace of the data flow according to the revision of the dataset, in some embodiments. As indicated at 2340, a result of the trace may be returned in response to the request, in some embodiments. For example, the different transforms applied to a dataset may be identified by evaluating the links, and corresponding identifiers and respective information (e.g., execution and revision information) may be returned.

The methods described herein may in various embodiments be implemented by any combination of hardware and software. For example, in one embodiment, the methods may be implemented by a computer system (e.g., a computer system as in FIG. 24) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 24:
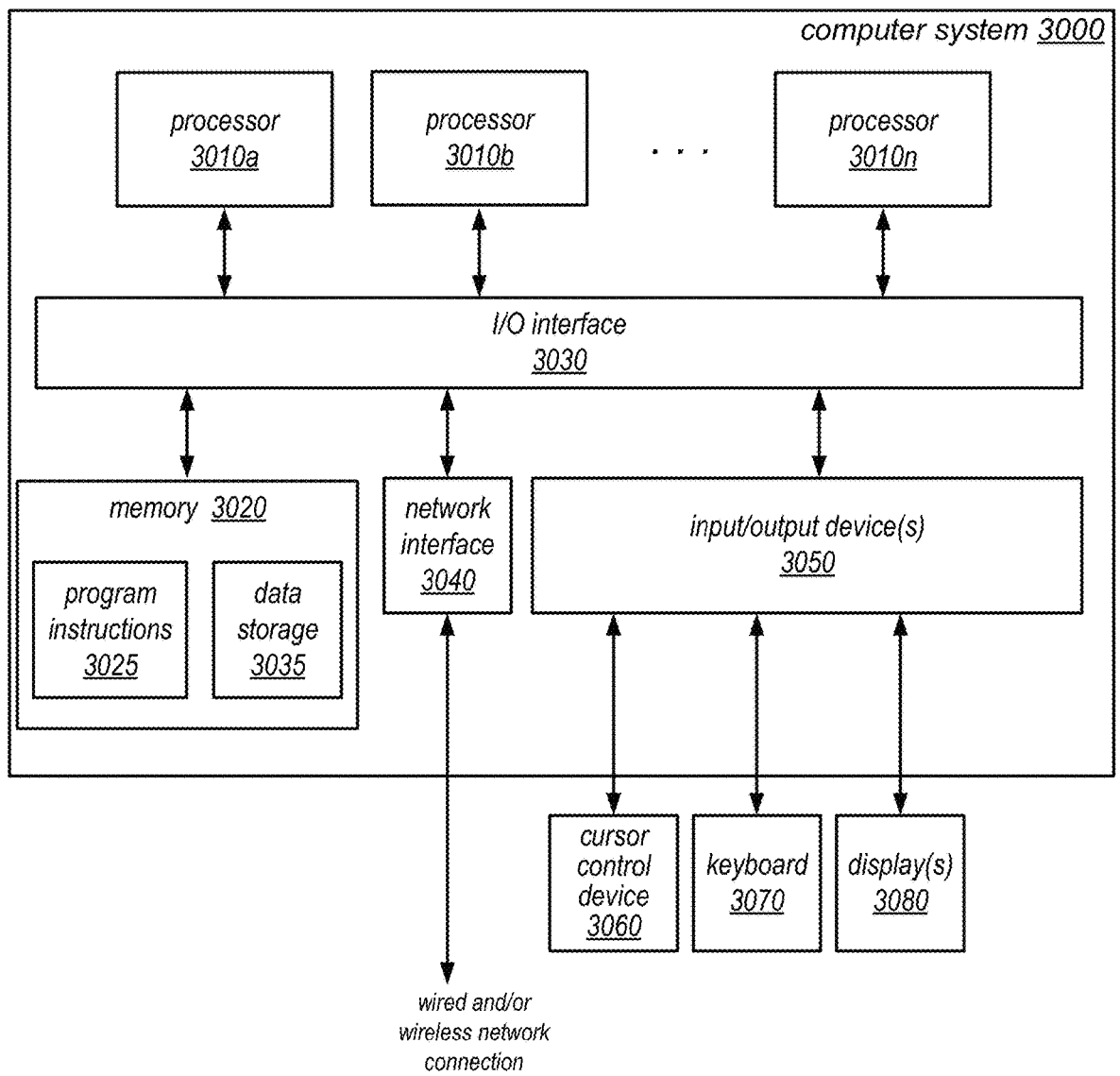
FIG. 24 illustrates an example system configured to implement the various methods, techniques, and systems described herein, according to some embodiments.

Embodiments of a system-independent data lineage service as described herein may be executed on one or more computer systems, which may interact with various other devices. One such computer system is illustrated by FIG. 24. In different embodiments, computer system 3000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 3000 includes one or more processors 3010 coupled to a system memory 3020 via an input/output (I/O) interface 3030. Computer system 3000 further includes a network interface 3040 coupled to I/O interface 3030, and one or more input/output devices 3050, such as cursor control device 3060, keyboard 3070, and display(s) 3080. Display(s) 3080 may include standard computer monitor(s) and/or other display systems, technologies or devices. In at least some implementations, the input/output devices 3050 may also include a touch- or multi-touch enabled device such as a pad or tablet via which a user enters input via a stylus-type device and/or one or more digits. In some embodiments, it is contemplated that embodiments may be implemented using a single instance of computer system 3000, while in other embodiments multiple such systems, or multiple nodes making up computer system 3000, may be configured to host different portions or instances of embodiments. For example, in one embodiment some elements may be implemented via one or more nodes of computer system 3000 that are distinct from those nodes implementing other elements.

In various embodiments, computer system 3000 may be a uniprocessor system including one processor 3010, or a multiprocessor system including several processors 3010 (e.g., two, four, eight, or another suitable number). Processors 3010 may be any suitable processor capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

In some embodiments, at least one processor 3010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 3020 may be configured to store program instructions and/or data accessible by processor 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 3020 as program instructions 3025 and data storage 3035, respectively. In other embodiments, program instructions and/or data may be received, sent or stored upon different types of computer-accessible media or on similar media separate from system memory 3020 or computer system 3000. Generally speaking, a non-transitory, computer-readable storage medium may include storage media or memory media such as magnetic or optical media, e.g., disk or CD/DVD-ROM coupled to computer system 3000 via I/O interface 3030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 3040.

In one embodiment, I/O interface 3030 may be configured to coordinate I/O traffic between processor 3010, system memory 3020, and any peripheral devices in the device, including network interface 3040 or other peripheral interfaces, such as input/output devices 3050. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In addition, in some embodiments some or all of the functionality of I/O interface 3030, such as an interface to system memory 3020, may be incorporated directly into processor 3010.

Network interface 3040 may be configured to allow data to be exchanged between computer system 3000 and other devices attached to a network, such as other computer systems, or between nodes of computer system 3000. In various embodiments, network interface 3040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3050 may, in some embodiments, include one or more display terminals, keyboards, keypads, touchpads, scanning devices, voice or optical recognition devices, or any other devices suitable for entering or retrieving data by one or more computer system 3000. Multiple input/output devices 3050 may be present in computer system 3000 or may be distributed on various nodes of computer system 3000. In some embodiments, similar input/output devices may be separate from computer system 3000 and may interact with one or more nodes of computer system 3000 through a wired or wireless connection, such as over network interface 3040.

As shown in FIG. 24, memory 3020 may include program instructions 3025, configured to implement the various methods and techniques as described herein, and data storage 3035, comprising various data accessible by program instructions 3025. In one embodiment, program instructions

3025 may include software elements of embodiments as described herein and as illustrated in the Figures. Data storage 3035 may include data that may be used in embodiments. In other embodiments, other or different software elements and data may be included.

Those skilled in the art will appreciate that computer system 3000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 3000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 3000 may be transmitted to computer system 3000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a data lineage system may present data lineage services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A system, comprising:
a plurality of computing devices, respectively comprising at least one processor and a memory, that implement a data lineage service as part of a provider network, the data lineage service configured to:
  receive, via an interface for the data lineage service, one or more requests to describe the execution of respective revisions of one or more transformations of a data flow, the respective revisions of the one or more transformations performed on a revision of a dataset and the respective revisions of the one or more transformations associated with one or more data processors that executed the one or more transformations;
  evaluate a graph modeling the data flow to identify respective child nodes of the graph representing different ones of the respective revisions of the one or more transformations that correspond to one or more parent nodes representing the one or more transformations; and
  record, by the data lineage service, the performance of the one or more transformations as part of a performance history for the data flow in the respective child nodes of the graph according to the described execution of the respective revisions of the one or more transformations specified in the one or more requests.

2. The system of claim 1, wherein the data lineage service is further configured to:
- receive a request to commit a change to the data flow as a transaction;
- store the transaction in a log describing committed changes to the data flow; and
- update the graph modeling the data flow according to the requested change.

3. The system of claim 2, wherein the data lineage service is further configured to:
- responsive to receipt of a request to provide a visualization of the data flow, generate a timeline to display via the interface of the data lineage system, wherein the timeline includes the change.

4. The system of claim 1, wherein the data lineage service is further configured to:
- receive a request to trace a performance of the data flow with respect to the revision of the dataset;
- identify a starting node in the graph to perform the trace according to a specified type of trace in the request;
- evaluate one or more links between the starting node and one or more other nodes in the graph to perform the trace of the data flow for the revision of the dataset; and
- return a result of the trace in response to the request.

5. A method, comprising:
- receiving, via an interface for a data lineage system, one or more requests to describe performance of one or more transformations of a data flow, the one or more transformations performed on a dataset and the one or more transformations associated with one or more data processors that performed the one or more transformations;
- identifying, by the data lineage system, respective child nodes of a graph modeling the data flow, wherein the respective child nodes represent respective revisions of the one or more transformations that correspond to one or more parent nodes representing the one or more transformations; and
- updating, by the data lineage system, the respective child nodes of the graph to include the performance of the one or more transformations specified in the one or more requests as part of a performance history for the data flow.

6. The method of claim 5, further comprising:
- receiving a request to trace a performance of the data flow with respect to a revision of the dataset;
- identifying a starting node in the graph to perform the trace according to a specified type of trace in the request;
- evaluating one or more links between the starting node and one or more other nodes in the graph to perform the trace of the data flow for the revision of the dataset; and
- returning a result of the trace in response to the request.

7. The method of claim 6, wherein the specified type of trace is a backward trace.

8. The method of claim 5, wherein the one or more requests to describe the performance of the one or more transformations of the data flow performed on the dataset comprise respective identifiers for a revision of the dataset and respective identifiers for the respective revisions of the one or more transformations.

9. The method of claim 5, wherein the dataset is a snapshot of a data stream.

10. The method of claim 5, wherein the one or more data processors comprise at least two different data processing applications.

11. The method of claim 5, further comprising:
- receiving a request to commit a change to the data flow as a transaction;
- storing the transaction in a log describing committed changes to the data flow; and
- updating the graph modeling the data flow according to the requested change.

12. The method of claim 11, further comprising:
- responsive to receiving a request to provide a visualization of the data flow, generating a timeline to display via the interface of the data lineage system, wherein the timeline includes the change.

13. The method of claim 5, wherein the data lineage system is a data lineage service offered by a provider network and wherein at least one of the one or more data processors is implemented external to the provider network.

14. One or more non-transitory, computer-readable storage media, storing program instructions that when executed on or across one or more computing devices cause the one or more computing devices to implement a data lineage system that implements:
- receiving, via an interface for the data lineage system, one or more requests to describe the performance of one or more transformations of a data flow, the one or more transformations performed on a dataset and the one or more transformations associated with one or more data processors that performed the one or more transformations;
- evaluating a graph modeling the data flow to identify respective child nodes of the graph, wherein the respective child nodes represent respective revisions of the one or more transformations that correspond to one or more parent nodes representing the one or more transformations; and
- updating the respective child nodes of the graph to include the performance of the one or more transformations specified in the one or more requests as part of a performance history for the data flow.

15. The one or more non-transitory, computer-readable storage media of claim 14, storing further instructions that when executed on or across the one or more computing devices cause the one or more computing devices to implement:
- receiving a request to commit a change to the data flow as a transaction;
- storing the transaction in a log describing committed changes to the data flow; and
- updating the graph modeling the data flow according to the requested change.

16. The one or more non-transitory, computer-readable storage media of claim 15, storing further instructions that when executed on or across the one or more computing devices cause the one or more computing devices to implement:
- sending an indication of the change to the data flow to one or more recipients.

17. The one or more non-transitory, computer-readable storage media of claim 14, storing further instructions that when executed on or across the one or more computing devices cause the one or more computing devices to implement:
- receiving a request to trace a performance of the data flow with respect to a revision of the dataset;
- identifying a starting node in the graph to perform the trace according to a specified type of trace in the request;

evaluating one or more links between the starting node and one or more other nodes in the graph to perform the trace of the data flow for the revision of the dataset; and returning a result of the trace in response to the request.

18. The one or more non-transitory, computer-readable storage media of claim 17, wherein the specified type of trace is a forward trace.

19. The one or more non-transitory, computer-readable storage media of claim 14, wherein the graph modeling the data flow identifies that the dataset is of a format specified according to a type object included in the graph and wherein the one or more transformations are specified in a revision of a flow object included in the graph.

20. The one or more non-transitory, computer-readable storage media of claim 14, wherein the data lineage system is a data lineage service offered by a provider network and wherein at least one of the one or more data processors is implemented external to the provider network.

* * * * *